US009648101B2

(12) United States Patent
Clark et al.

(10) Patent No.: US 9,648,101 B2
(45) Date of Patent: May 9, 2017

(54) SYNCHRONIZATION OF WEB SERVICE ENDPOINTS IN A MULTI-MASTER SYNCHRONIZATION ENVIRONMENT

(71) Applicant: Microsoft Technology Licensing, LLC, Redmond, WA (US)

(72) Inventors: Michael Ray Clark, Redmond, WA (US); Moe Khosravy, Kirkland, WA (US); Oliver C. Lee, Redmond, WA (US); Lev Novik, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/668,916

(22) Filed: Mar. 25, 2015

(65) Prior Publication Data

US 2015/0201014 A1    Jul. 16, 2015

Related U.S. Application Data

(63) Continuation of application No. 11/859,931, filed on Sep. 24, 2007, now abandoned.

(51) Int. Cl.
*G06F 15/16* (2006.01)
*H04L 29/08* (2006.01)
(Continued)

(52) U.S. Cl.
CPC .... *H04L 67/1095* (2013.01); *G06F 17/30575* (2013.01); *G06N 5/02* (2013.01); *H04L 67/02* (2013.01)

(58) Field of Classification Search
CPC .................................................. G06F 17/30575
(Continued)

(56) References Cited

U.S. PATENT DOCUMENTS 6,317,754 B1    11/2001  Peng
7,317,926 B1 *   1/2008  Cloutier .............. H04L 12/5692
                                                          348/735
(Continued)

FOREIGN PATENT DOCUMENTS

EP          1693771       8/2006
JP       2000-299698     10/2000
(Continued)

OTHER PUBLICATIONS

Lukasz, Juszcyk, "Web Service Discovery, Replication, and Synchronization in Ad-Hoc Networks", Sep. 2006. Available at <<http://www.infosys.tuwein.ac.at/staff/lukasz/06_DILSOS_juszczyk_lazowski_dustar.pdf>>.
(Continued)

*Primary Examiner* — Hamza Algibhah
(74) *Attorney, Agent, or Firm* — Workman Nydegger

(57) ABSTRACT

A Web service synchronization protocol is provided that sets forth the metadata and messaging by which endpoints roam, share and synchronize common information with one another in a multi-master networked computing ecosystem. A general SOAP-based protocol is defined for synchronizing data between two endpoints where one or more of the endpoints supports a Web service. Defining messaging for knowledge-based transfers using XML Web services, the protocol allows devices, services and applications to synchronize through firewalls, allows for flexibility by allowing any common set or subset of information across endpoints and allows for extensibility by not prescribing the schema of the actual data being synchronized at the endpoints.

23 Claims, 22 Drawing Sheets

(51) Int. Cl.
*G06F 17/30* (2006.01)
*G06N 5/02* (2006.01)

(58) Field of Classification Search
USPC .......................................................... 709/248
See application file for complete search history.

(56) References Cited

U.S. PATENT DOCUMENTS

| | | | |
|---|---|---|---|
| 7,478,381 B2 | 1/2009 | Roberts et al. | |
| 7,574,706 B2 | 8/2009 | Meulemans et al. | |
| 7,747,561 B1* | 6/2010 | Gupta et al. | |
| 7,756,825 B2* | 7/2010 | Khosravy et al. | 707/611 |
| 8,090,685 B2* | 1/2012 | Clark et al. | 707/612 |
| 2003/0004955 A1 | 1/2003 | Cedola et al. | |
| 2003/0093435 A1* | 5/2003 | Bandekar | 707/103 R |
| 2003/0177408 A1 | 9/2003 | Fields et al. | |
| 2004/0068516 A1* | 4/2004 | Lee et al. | 707/103 Y |
| 2005/0044187 A1* | 2/2005 | Jhaveri | G06F 17/30206 709/219 |
| 2005/0086272 A1* | 4/2005 | Novik et al. | 707/201 |
| 2005/0246389 A1* | 11/2005 | Shah et al. | 707/200 |
| 2006/0015816 A1 | 1/2006 | Kuehner et al. | |
| 2006/0031264 A1 | 2/2006 | Bosworth et al. | |
| 2006/0080363 A1 | 4/2006 | Vadlamani et al. | |
| 2006/0215569 A1* | 9/2006 | Khosravy et al. | 370/241 |
| 2006/0235970 A1 | 10/2006 | Bateman et al. | |
| 2006/0251125 A1 | 11/2006 | Goring et al. | |
| 2007/0061487 A1* | 3/2007 | Moore | G06F 17/30575 709/246 |
| 2007/0067354 A1 | 3/2007 | Mullender et al. | |
| 2007/0074121 A1 | 3/2007 | Mullender et al. | |
| 2007/0088790 A1 | 4/2007 | Shenfield et al. | |
| 2007/0156842 A1 | 7/2007 | Vermeulen et al. | |
| 2007/0162518 A1 | 7/2007 | Tian | |
| 2007/0239864 A1 | 10/2007 | Kwon et al. | |
| 2008/0005350 A1* | 1/2008 | Logvinov | 709/231 |
| 2008/0046437 A1* | 2/2008 | Wood | G06F 17/30578 |
| 2008/0098453 A1 | 4/2008 | Hinton et al. | |
| 2008/0162604 A1 | 7/2008 | Soulet et al. | |
| 2008/0168126 A1 | 7/2008 | Freedman | |
| 2008/0270481 A1 | 10/2008 | Augustine | |
| 2008/0288547 A1 | 11/2008 | Brodsky et al. | |
| 2009/0055441 A1 | 2/2009 | Kalia et al. | |
| 2009/0063504 A1 | 3/2009 | Banister et al. | |
| 2009/0077002 A1 | 3/2009 | Clark et al. | |
| 2009/0228732 A1* | 9/2009 | Budde et al. | 713/400 |
| 2009/0287726 A1 | 11/2009 | Verhoeven | |
| 2015/0120664 A1 | 4/2015 | Clark et al. | |

FOREIGN PATENT DOCUMENTS

| | | |
|---|---|---|
| JP | 2004-280447 | 10/2004 |
| WO | WO 0067410 | 11/2000 |
| WO | WO 2006111012 | 3/2006 |
| WO | 2007097846 A1 | 8/2007 |
| WO | WO 2007094585 | 8/2007 |

OTHER PUBLICATIONS

Mangala, Gowri Nanda, "Synchronization Analysis for Decentralization Composite Web Services", Feb. 3, 2003. Available at <<http://delivery.acm.org/10.1145/960000/952612/p407-nanda.pdf?key1=95261&key2=5942700811&coll=GUIDE&dl=Guide&CFID=19582149&CFToKEN=44167093>>.

"SoapMSMQ Transport. SoapMSMQ Transport update for the WSE 3.0 Technology", Mar. 6, 2006. Available at <<http://www.codeproject.com/useritems/soapmsmq_wse.asp>>.

Burgett, David, "Use Data Caching Techniques to Boost Performance and Ensure Synchronization", May 28, 2007. Available at <<http://msdn.microsoft.com/msdnmag/issues/02/12/WebFarms/>>.

"Interacting with the Project Tracker Web Service: An Overview." May 25, 2007. Available at <<http://api.open.collab.net/project-tracker/api-overview.pdf>>.

Baloian, et al., "MatchMaker—A Flexible Synchronizing Mechanism for Distributed Applications through Firewalls", Proceedings of the 10th International Conference on Computer Supported Cooperative Work in Design, May 2006.

Tarkoma, Sasu, et al., "Fuego: Experiences With Mobile Data Communication and Synchronization", The 17th Annual IEEE International Symposium on personal, Indoor and Mobile Radio Communications (PIMRC'06), Sep. 2006.

Dustdar, Scharam, et al., "Dyanmic Replication and Synchronization of Web Services for High Availability in Mobile Ad-Hoc Networks", Service oriented Computing and Applications, springer London, vol. 1, No. 1, Apr. 2007.

International Search Report & Written Opinion dated Apr. 24, 2009 for PCT Application Serial No. PCT/US08/077395, 11 pages.

"Office Action Received in Japan Patent Application No. 2013-245860", Mailed Date: Sep. 30, 2014, 7 pages.

"Extended European Search Report Received for European Patent Application No. 08834595.4", Mailed Date: Dec. 22, 2014, 5 pages.

U.S. Appl. No. 11/859,931, Mar. 3, 2010, Office Action.
U.S. Appl. No. 11/859,931, Sep. 17, 2010, Office Action.
U.S. Appl. No. 11/859,931, Feb. 16, 2012, Office Action.
U.S. Appl. No. 11/859,931, Oct. 5, 2012, Office Action.
U.S. Appl. No. 11/859,931, Apr. 25, 2013, Office Action.
U.S. Appl. No. 11/859,931, Feb. 13, 2014, Office Action.
U.S. Appl. No. 11/859,931, Sep. 25, 2014, Notice of Allowance.
U.S. Appl. No. 11/859,931, Dec. 24, 2014, Notice of Allowance.
U.S. Appl. No. 11/859,931, Apr. 9, 2015, Office Action.
U.S. Appl. No. 14/582,894, Apr. 9, 2015, Office Action.

"Office Action Issued in Korean Patent Application No. 10-2010-7003874", Mailed Date: Jan. 16, 2015, 9 Pages.

"Office Action Issued in Canadian Patent Application No. 2,695,017", Mailed Date: Apr. 10, 2015, 4 Pages.

"Office Action Issued in Japan Patent Application No. 2013-245860", Mailed Date: Apr. 8, 2015, 6 Pages.

"Office Action Issued in Canadian Patent Application No. 2695017", Mailed Date: Jun. 20, 2016, 4 Pages.

* cited by examiner

SYNCHRONIZATION OF WEB SERVICE ENDPOINTS IN A MULTI-MASTER SYNCHRONIZATION ENVIRONMENT

CROSS-REFERENCE TO RELATED APPLICATIONS

This application is a continuation of U.S. patent application Ser. No. 11/859,931, filed Sep. 24, 2007, entitled "SYNCHRONIZATION OF WEB SERVICE ENDPOINTS IN A MULTI-MASTER SYNCHRONIZATION ENVIRONMENT," which is incorporated herein by reference in its entirety.

TECHNICAL FIELD

The subject disclosure relates to a synchronization protocol for loosely coupled devices to synchronize with one another in a multi-master synchronization environment.

BACKGROUND

The popularity of mobile computing and communications devices has created a corresponding wish for the ability to deliver and receive information whenever wanted by users. Put simply, users want ubiquitous access to information and applications from a variety of devices, wherever, whenever, and whatever the devices' capabilities, and in addition, users want to be able to access and update such information on the fly, and they want guarantees that the data is as correct and up to date as can be.

There are a variety of distributed data systems that attempt to have devices and objects share replicas of data with one another. For instance, music sharing systems may synchronize music between a PC, a Cell phone, a gaming console and an MP3 player. Email data may be synchronized among a work server, a client PC, and a portable email device. However, today, to the extent such devices synchronize a set of common information among one another, the synchronization takes place according to a static setup among the devices. However, when these devices become disconnected frequently or intermittently, i.e., when they are loosely coupled such that they may become disconnected from communications with each other, e.g., when a cell phone is in a tunnel, or when the number of devices to be synchronized is dynamic, it becomes desirable to have a topology independent way for the devices to determine what changes each other device needs when they re-connect to one another, or as they join the network.

Today, as shown in FIG. 1, there are various examples where a master node 100 synchronizes in a dedicated manner with a client node 110, such as when an email server synchronizes with an email client. Due to the dedicated synchronization between the two devices, the information 102 needed to synchronize between the two devices can be tracked by the master node 100. Such information 102 can also optionally be tracked by client node 110 as well, however, when the connection between master node 100 and client node 110 becomes disconnected at times, and when the number of synchronizing devices increases, tracking the necessary information of the common information that each device needs across all of those devices becomes a difficult problem.

Current solutions often base their synchronization semantics solely on clocks or logical watermarks for a specific node (e.g., the email server), as opposed to any node. These systems can work well in cases of a single connecting node or master. However, they run into problems when the topology or pattern in which the nodes connect changes unpredictably.

Other systems build proprietary synchronization models for specific kinds of data objects, tracking an enormous amount of primitive metadata specific to the data format across the devices in order to handle the problem. For instance, to synchronize objects of a particular Word processing document format, a lot of overhead and complexity must go into representing a document and its fundamental primitives as they change over time, and representing that information efficiently to other devices wishing to synchronize according to a common set of Word processing documents. In addition to such systems being expensive and complex to build and non-extendible due to the custom data format upon which they are based, such systems are inherently unscalable due to large amounts of metadata that must be generated, analyzed and tracked.

In addition, the solutions only apply to the one specific domain, e.g., Word processing documents. When synchronization objects of all kinds are considered, e.g., pictures, videos, emails, documents, database stores, etc., one can see that implementing custom synchronization solutions based on each object type for tracking evolution of such objects across all devices in a multi-master environment is unworkable today. Accordingly, such solutions cannot be said to decouple the synchronization semantics from the data semantics.

Thus, there is a need for node-independent synchronization knowledge when computers in a topology change the way they connect to each other or as the number of computers grows. For instance, with a media player, it might be desirable to synchronize among multiple computers and multiple websites. In most instances, most applications can only synchronize data between a few well-known endpoints (home PC and media player). As the device community evolves over time for a user of the media player application, however, the need for data synchronization flexibility for the music library utilized by the devices increases, thereby creating the need for a more robust system.

The need becomes even more complex when one considers the growth of Web services endpoints that are increasingly involved in receiving, generation, processing, storage, updating and transmitting data, generating a variety of network traffic to or from devices. In this regard, in parallel with the evolution of synchronization needs of devices, a coincident trend is that more data is being created, stored, manipulated, transmitted, etc., by Web services, i.e., software systems designed to support interoperable machine to machine interaction over a network. Typically, Web services are Web APIs that can be accessed over a network by client devices, such as the Internet, and executed on a remote system hosting the requested services. However, there is no way to synchronize with Web services as a generic endpoint as part of a loosely coupled multi-master synchronization environment, either.

In this respect, from a synchronization standpoint in a multi-master environment, Web services implementations of an endpoint that can synchronize to any device would be a valuable scenario since two devices may not be able to connect directly, but may be able to connect via a common Web services endpoint. In this regard, complications arise when attempting to synchronize among loosely coupled devices and Web services when there is no mechanism for understanding, independent of the objects being synchronized, the collective knowledge of all of the set of devices that are connected, as those devices invariably connect and disconnect from one or more networks that couple them all together as part of an evolving and devolving network topology of nodes.

Thus, what is needed is an efficient, simple and universal mechanism for representing what each of the connected devices know and do not know, so that the common information can be pieced together to the maximum extent permitted by the collective knowledge of the individuals/ devices. Moreover, there is a need to accommodate Web services as a synchronization node in such a multi-master system to help facilitate loosely connected systems of nodes to describe the data, and versions of the data, they have, to describe where they received the data, and to further describe what data they need from another node involved in the conversation.

Additional detail about these and other deficiencies in the current state of synchronization among loosely coupled devices may become apparent from the description of the various embodiments of the invention that follows.

SUMMARY

A Web service synchronization protocol is provided that sets forth the metadata and messaging by which endpoints roam, share and synchronize with one another in a multi-master networked computing ecosystem. In various non-limiting embodiments, a general SOAP-based protocol for synchronizing data between two endpoints is provided where one or more of the endpoints support a Web service. The protocol defines messaging for knowledge-based transfers using XML Web services, allowing devices, services and applications to synchronize through firewalls in a flexible manner that permits any common set or subset of information across endpoints and allowing for extensibility by not prescribing the schema of the actual data being synchronized at the endpoints.

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments of the invention in a simplified form as a prelude to the more detailed description of the various embodiments of the invention that follows.

BRIEF DESCRIPTION OF THE DRAWINGS

The Web services synchronization protocol and techniques for synchronizing using the protocol are further described with reference to the accompanying drawings in which.

DETAILED DESCRIPTION

Overview

As described in the background, given today's disconnected and distributed manner of computing, what is desired is the ability to use applications and information on a device, and synchronize any updates with the applications and information back at the office, or with devices of a home network, etc. In this regard, the scenarios for synchronization are limitless.

In a multi-master synchronization environment, the ability to synchronize is desirable anywhere and anytime a device comes into contact with one or more nodes of a loosely coupled set of nodes, including Web services endpoints. However, it is desirable to undergo an efficient knowledge exchange without tracking burdensome amounts data specific metadata. Unfortunately, networked data does not today support synchronization with any mobile device and mobile devices do not support synchronization with any networked data. Rather, there is a proliferation of different, proprietary data synchronization protocols for mobile devices. Each of these protocols is only available for selected transports, implemented on a selected subset of devices, and able to access a small set of networked data. The absence of a single synchronization standard poses many problems for end users, device manufacturers, application developers, and service providers.

Mobile computing thus has a pervasive issue—data synchronization. All the popular mobile devices—handheld computers, mobile phones, pagers, laptops—synchronize their data with network applications, music applications, desktop calendars, and other locations where information is stored. This ability to access and update such information on the fly under conditions of intermittent connectivity, however, is fast becoming a pervasive part of mobile computing. Yet, today, almost every device uses a different technology for performing data synchronization.

Thus, any distributed data system that wishes to share common information across multiple loosely coupled devices including Web services endpoints needs an efficient way to represent what changes to the common information of which they are aware and what changes of which they are unaware.

In consideration of these needs, in various non-limiting embodiments, the invention provides a data type agnostic synchronization protocol that enables Web service endpoints to participate in synchronization of a common set or subset of information among nodes and other Web service endpoints in a multi-master synchronization environment. A data synchronization protocol is provided that defines communications for a data synchronization session when a device is connected to another node or Web service endpoint in a network. The protocol supports a knowledge framework for synchronizing among nodes including identification and versioning of objects and common protocol commands for an efficient knowledge exchange to synchronize local and network data.

Figure 1:
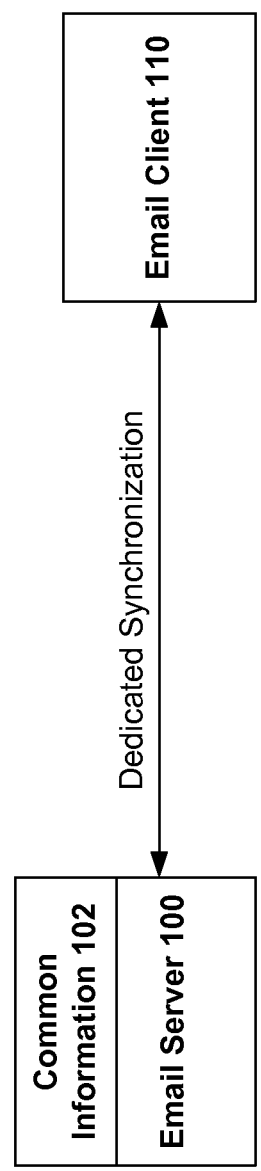
FIG. 1 illustrates a dedicated synchronization system that provides synchronization between two well defined endpoints of the system.
Figure 2A:
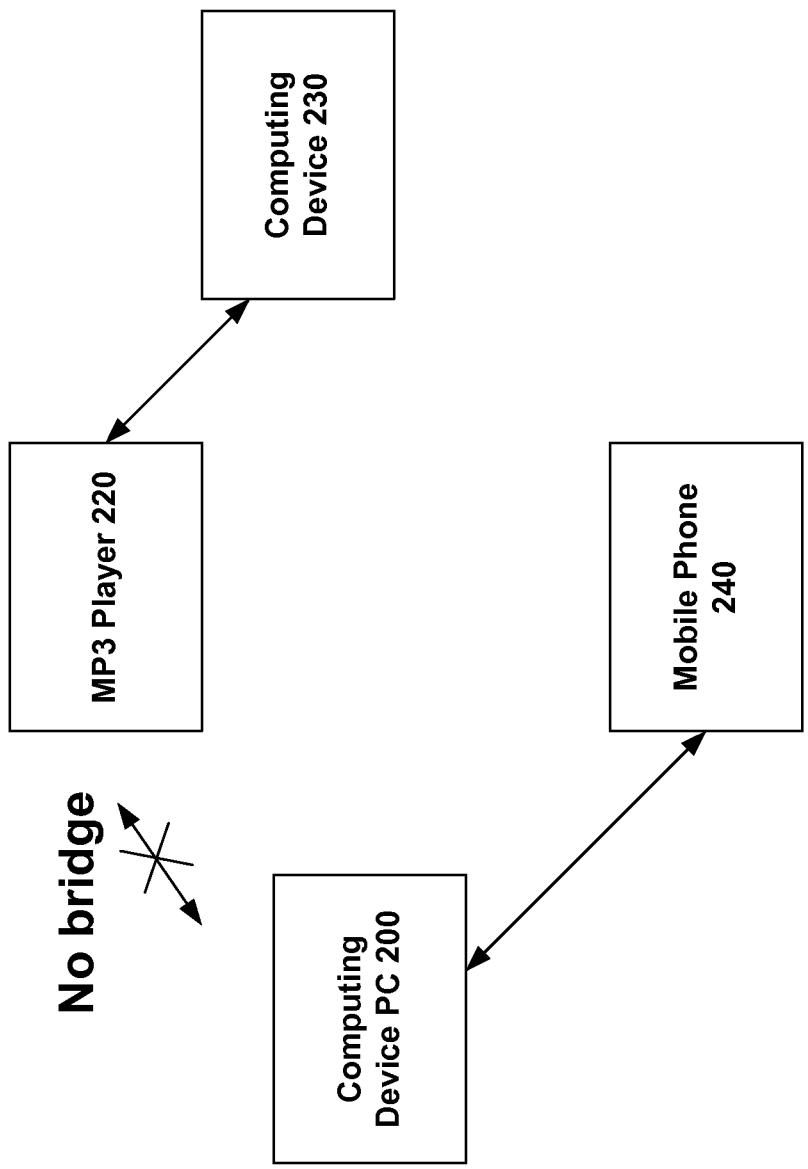
FIG. 2A is a block diagram illustrating an exemplary multi-master synchronization environment where some nodes may come into contact with one another infrequently or not at all.

As shown in FIG. 2A, a representative multi-master synchronization environment might be represented by a user's desire to store music, and synchronize the user's music across all of the user's devices, wherever and whenever the music collection changes. For instance, at the user's house, the user may have an MP3 player 220 and a computing device 230 that can synchronize with one another. Similarly, at the user's place of employment, the user might have another computer device 200 and a mobile phone 240. In this respect, the user has no trouble synchronizing the mobile phone 240 with device 200 when in contact with it, but as part of company policy, the user cannot carry the mobile phone 240 away from work. Thus, in this hypothetical scenario, the devices at home can synchronize via a knowledge based exchange and the devices at work can synchronize via a knowledge based exchange, however, there is no bridge to transfer knowledge from work devices to home devices, or vice versa. Thus, what would be desirable would be able to synchronize to a Web service endpoint. The protocol of the invention, in various non-limiting embodiments described in more detail below, enables such a knowledge based exchange via XML messaging with a Web service endpoint to give additional synchronization options and flexibility in a multi-master synchronization environment.

Figure 2B:
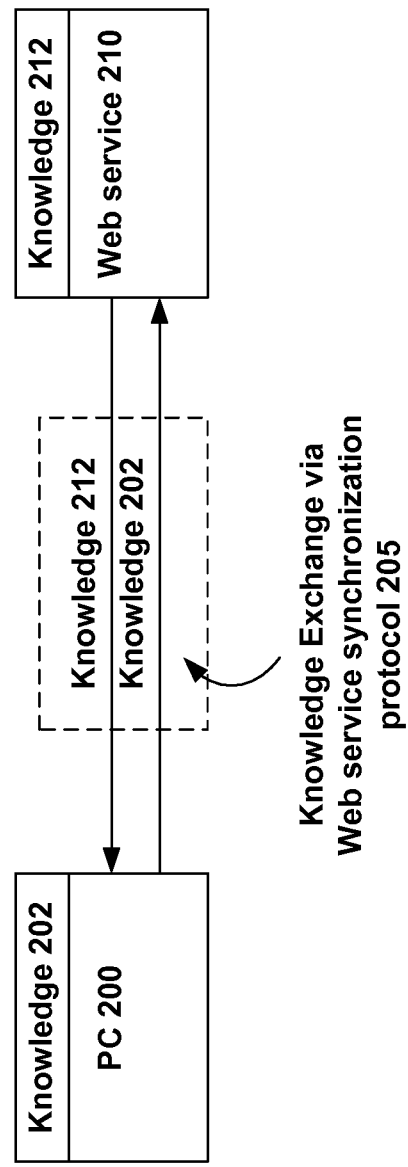
FIG. 2B illustrates an exemplary scenario wherein a node synchronizes with a Web service endpoint in accordance with a Web services synchronization protocol in accordance with non-limiting embodiments of the invention.

As shown in FIG. 2B, leveraging an efficient knowledge based synchronization framework for exchanging understanding about a common set or subset of information among nodes of a multi-master synchronization ecosystem, a knowledge based exchange with a Web service endpoint is enabled. As illustrated, PC 200 includes knowledge 202, which includes a set of objects and their versions (e.g., timestamp). By invoking a Web service synchronization request of Web service endpoint 210, PC 200 sends its knowledge 202 to Web service 210, which in turn has its own knowledge 212 to compare against knowledge 202. In return, Web service 210 returns knowledge 212 to PC 200. The details of the knowledge exchange framework are described in more detail below. In this regard, a Web services synchronization protocol 205 is provided that defines the way PC 200 sends XML messages to Web service 210 to have a knowledge based synchronization based on knowledge 202 and 212. As a result, Web service endpoint 210 picks up any knowledge 202 understood by the client that the Web service endpoint 210 does not appreciate and vice versa.

Figure 2C:
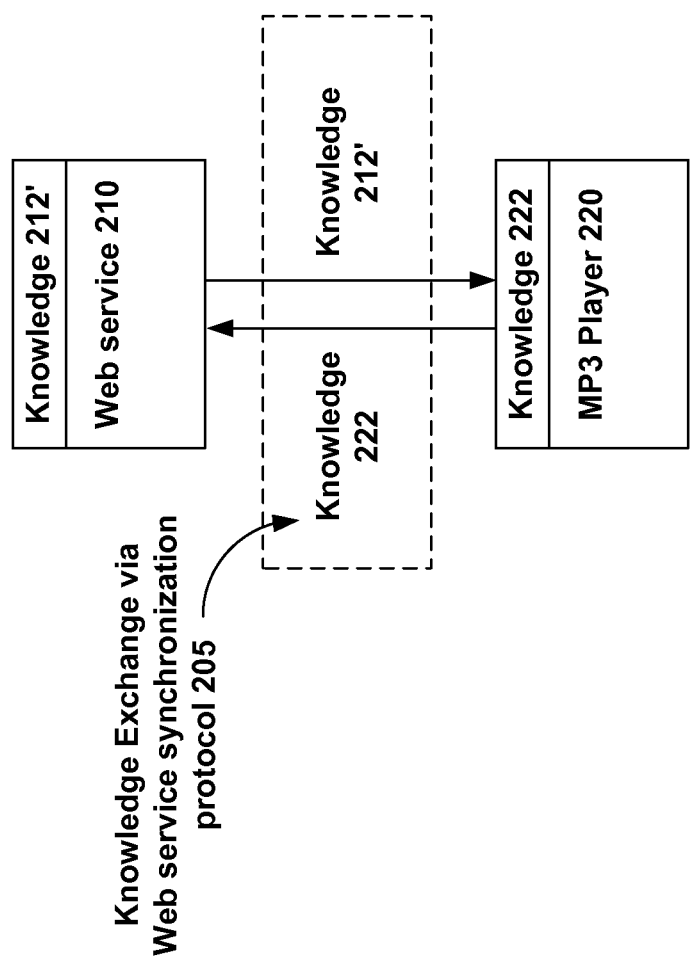
FIG. 2C illustrates an exemplary scenario wherein a Web service endpoint synchronizes with a node in accordance with a Web services synchronization protocol in accordance with non-limiting embodiments of the invention.

As a result of the exchange with Web service endpoint 210, knowledge 212 is updated to knowledge 212', as shown in FIG. 2C, where device 200 of FIG. 2B becomes disconnected, but MP3 Player 220 becomes connected to the Web service 210, making a request to synchronize with the Web service endpoint 210 with the Web service synchronization protocol 205. In this regard, a knowledge exchange occurs with respect to knowledge 222 and 212' in which case MP3 Player 220 learns that part of knowledge 212' that MP3 Player 220 does not know, and vice versa.

Figure 2D:
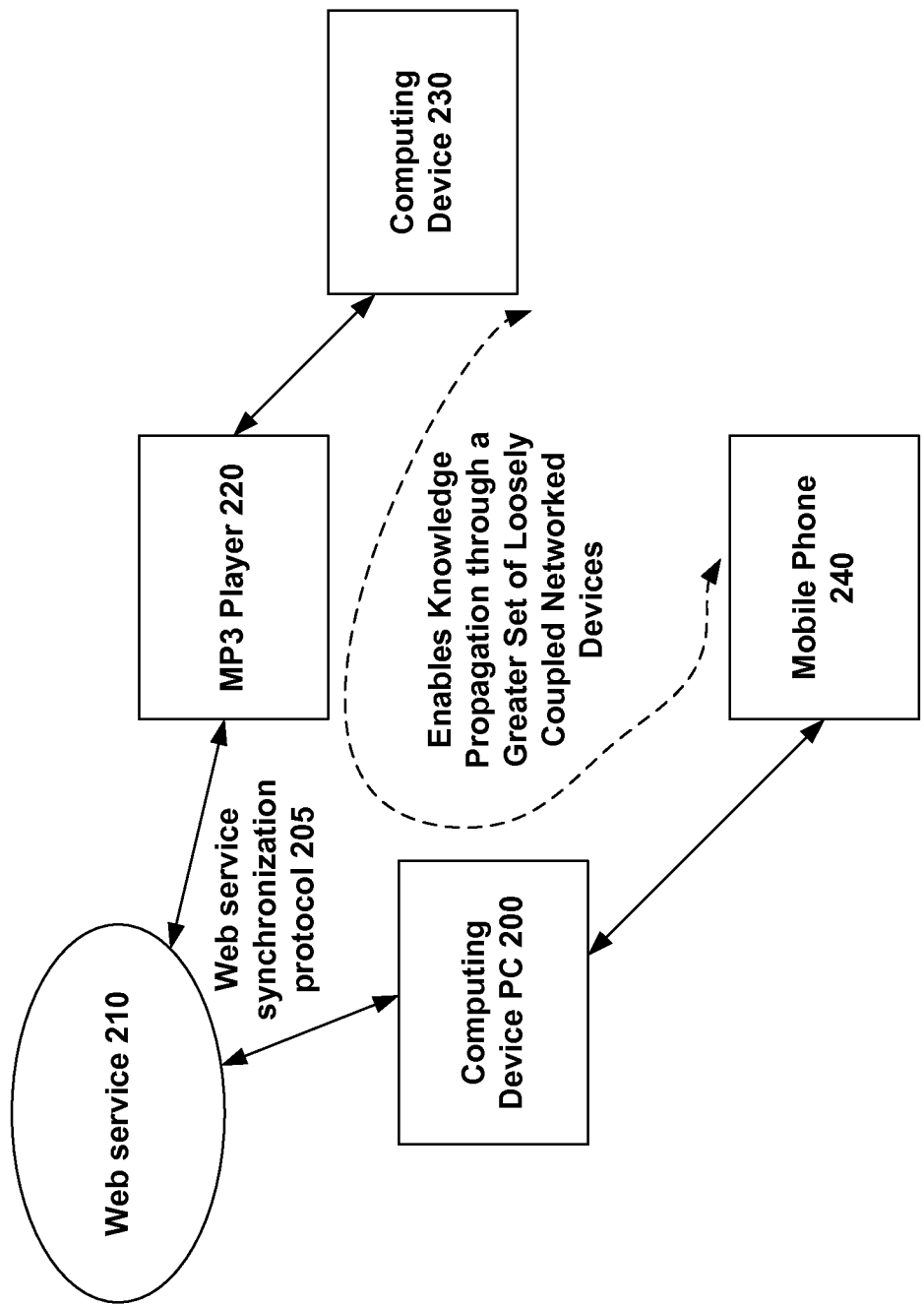
FIG. 2D illustrates an exemplary scenario wherein a nodes of a multi-master synchronization environment achieve a richer exchange of knowledge according to non-limiting embodiments of the Web services synchronization protocol of the invention.

In this way, as shown in FIG. 2D, a Web service endpoint 210, following the same synchronization framework for representing knowledge among nodes that connect, disconnect and synchronize in a multi-master synchronization environment, can synchronize with any of the nodes, and thereby facilitate the learning of knowledge across all of a user's nodes, even where some nodes never connect directly with other nodes of the multi-master synchronization group.

Efficient Knowledge Representation and Exchange

As a prelude to describing the synchronization protocol for synchronizing data or subsets of data among nodes in a multi-master synchronization environment including synchronization with Web service endpoints in accordance with various non-limiting embodiments of the invention, in this section, an overview is presented of a general mechanism for efficiently representing knowledge in data synchronization systems. The general mechanism includes (1) an efficient exchange of knowledge between connected devices by requiring only the minimum data needed by a first node from a second node to be sent, (2) the ability to efficiently and correctly recognize disagreements over the state of data, i.e., conflicts, between a first node and a second node, (3) the ability to synchronize an arbitrary number of nodes and (4) the ability to synchronize any node via any other node, i.e., the ability to work in a peer to peer, multi-master synchronization environment.

With the general mechanism, any number of changes can be made to some information that is to be shared between the two devices. At any time they become connected, by exchanging their knowledge with one another, they become aware of at least the minimum amount of information needed to reconstruct what each other knows and doesn't know to facilitate of changes between the devices. It is noted that where more than two devices are involved, knowledge may be incomplete knowledge of a greater base of information to be shared, but as more knowledge is shared around the multiple devices, collective knowledge continues to be accrued by the devices as they connect to the other devices over time.

Advantageously, in various non-limiting embodiments, the invention operates to perform synchronization for a set of devices, or, as described below, a subset of devices, all interested in maintaining the latest versions of a set of objects, but also allows such devices to come into connection and out of connection with the other objects of the set. Whenever a device comes back into connection with other device(s) of the set of devices via one or more networks, the device regains collective knowledge that is as up to date as the other device(s) represent with their collective knowledge. In this fashion, even loosely connected devices may come into and out of contact with a set of devices, and then relearn all the knowledge missed by coming into contact with any set of devices that possess the latest set of collective knowledge.

Figure 3A:
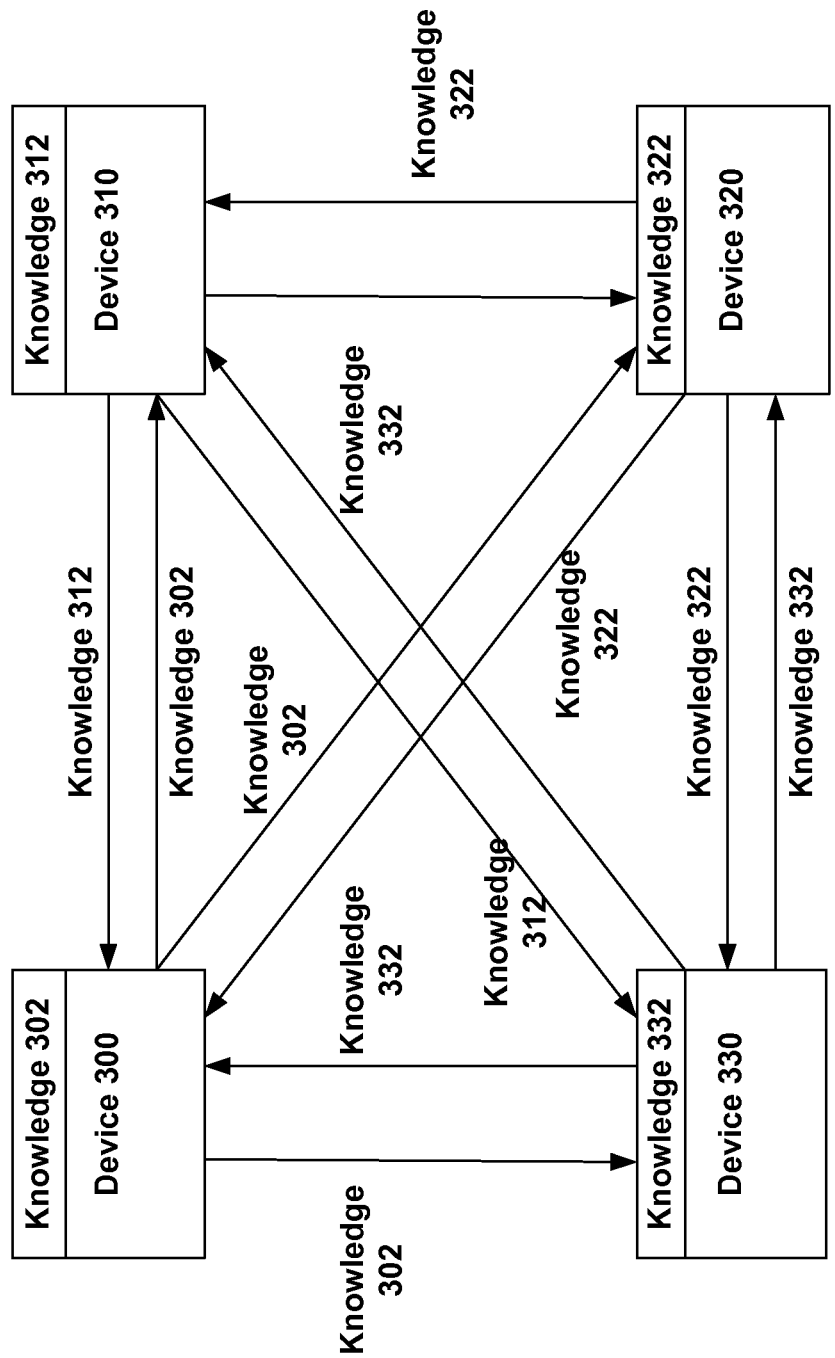
FIG. 3A illustrates exemplary non-limiting knowledge exchange between four nodes of a loosely connected network of nodes.

FIG. 3A illustrates that knowledge exchanges are generalizable, or scalable, to any number of devices. As shown, four devices 300, 310, 320 and 330 are shown with knowledge representations 302, 312, 322 and 332 that respectively indicate what each device knows and doesn't know about a set of common information to be shared across the devices.

Figure 3B:
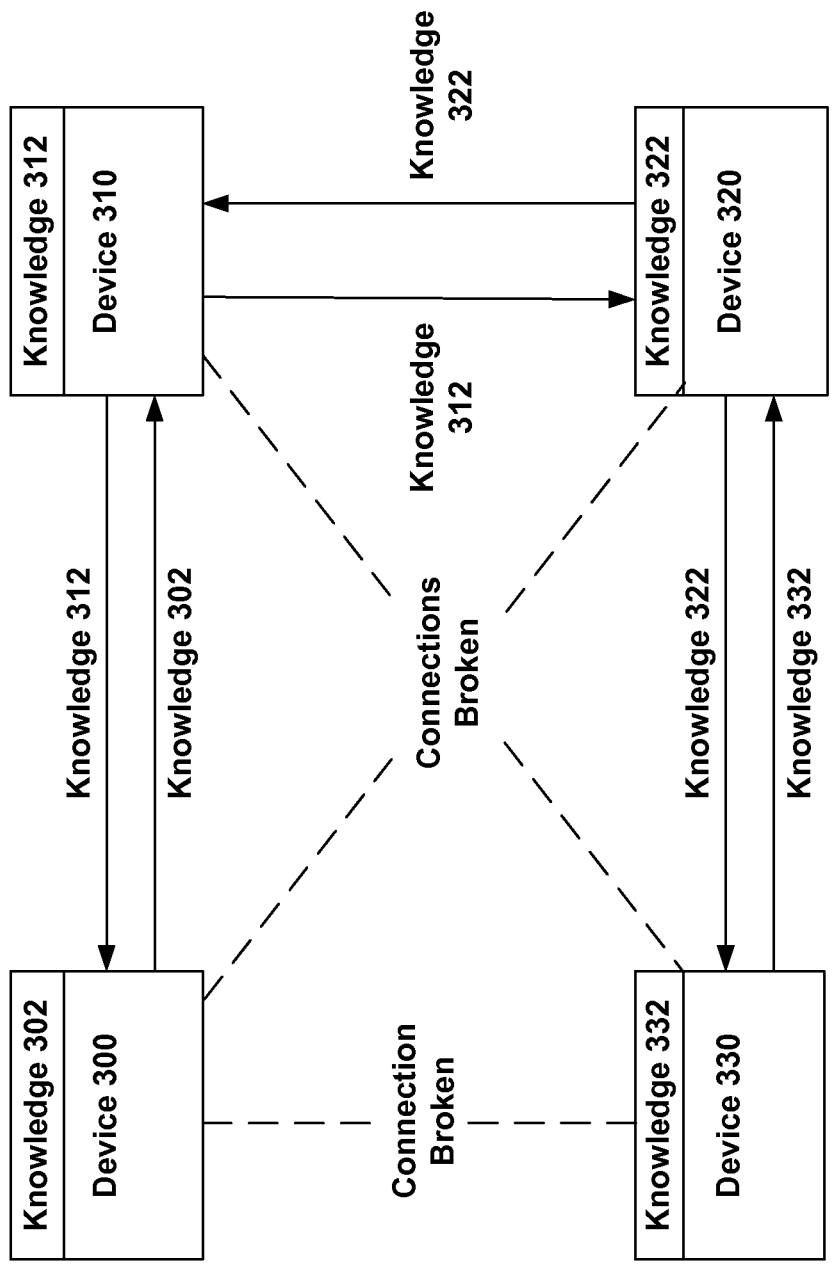
FIG. 3B illustrates exemplary non-limiting knowledge exchange between four nodes of a loosely connected network of nodes when some of the devices become disconnected from one another.

Advantageously, as shown by FIG. 3B, even where connections in the network become disconnected, a complete set of knowledge can nonetheless be gained by all of the devices 300, 310, 320, and 330, as long as at least one connection directly or indirectly exists to the other devices. For instance, as shown, knowledge 332 of device 330 still reaches device 300 via the knowledge exchange with device 320, then via the knowledge exchange between device 320 and 310, and finally via the knowledge exchange between device 310 and 300.

With more devices sharing knowledge about common information to be shared, all of the devices benefit because knowledge exchange(s) in accordance with various non-limiting embodiments of the invention of the invention are agnostic about from which device collective knowledge comes. The devices each independently operate to try to gain as much knowledge about information to be shared among the devices from any of the other devices to which it is connected.

In exemplary non-limiting detail, a method is described in further detail for two nodes to engage in a conversation and at the end of the conversation to have equivalent knowledge for the concerned data set. The method is scalable beyond two nodes by creating a knowledge exchange capability for each new device entering the peer-to-peer network.

Figure 4A:
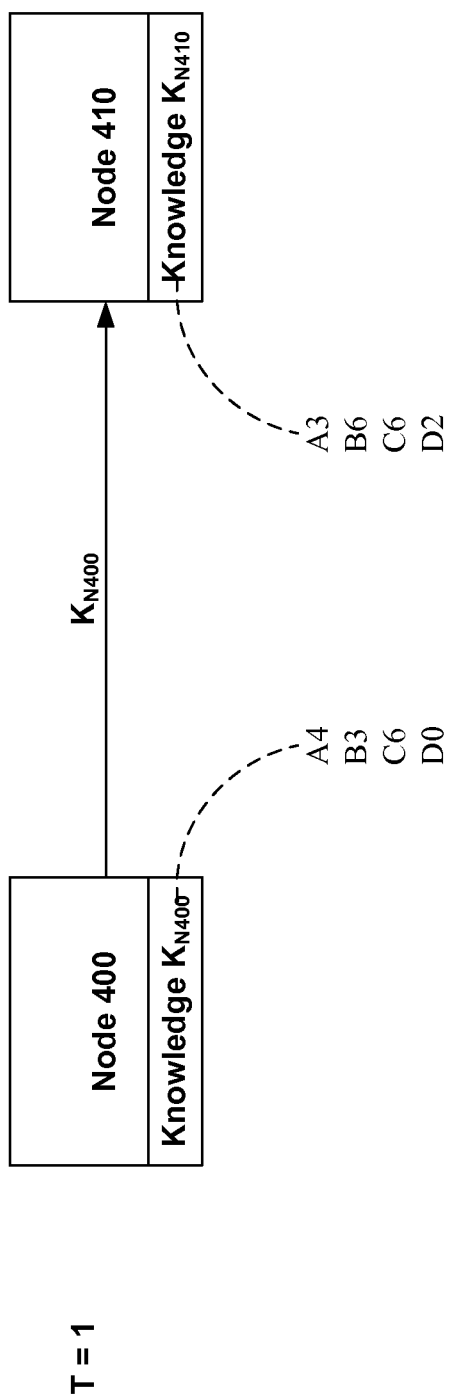
FIGS. 4A, 4B and 4C illustrate exemplary knowledge exchange in the context of multiple objects shared among nodes of a network.

Thus, as shown in FIG. 4A, node 400 of a peer-to-peer network having any number of nodes wants to exchange data with Node 410. Node A begins by requesting changes from Node 410 and in order to do so Node 400 sends its knowledge (represented as $K_{N400}$) to Node 410 as shown.

Knowledge of a device or node is represented by labeling each object to be shared among devices with a letter identifier, and then the trailing number represents the latest version for this object. For instance, $K_{N400}$ as shown in FIG. 4A includes objects A, B, C and D each to be synchronized between nodes 400 and 410, and the number following each of the objects represents the latest version of the object known on the device. For instance, knowledge $K_{N400}$ at a time t=1 includes the $5^{th}$ version of A, the $4^{th}$ version of B, the $7^{th}$ version of C, and the $1^{st}$ version of D, notated as A4, B3, C6, D0 in FIG. 4A. In contrast, knowledge $K_{N410}$ of node 410 at a time t=1 may include the $4^{th}$ version of A, the $7^{th}$ version of B, the $7^{th}$ version of C, and the $3^{rd}$ version of D, notated as A3, B6, C6, D2 in FIG. 4A.

Figure 4B:
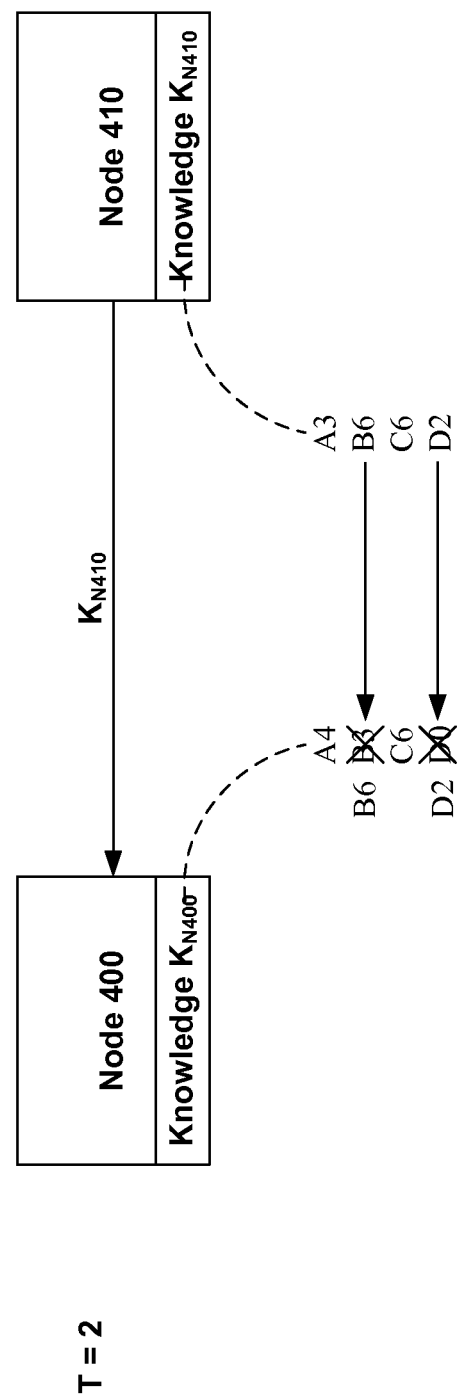

As shown in FIG. 4B, at time T=2, node 410 compares knowledge $K_{N400}$ received from node 400 against its own knowledge $K_{N410}$ and determines what needs to be sent to node 400. In this example, as a result, node 410 will send node 400 the changes relating to B and D since node 400's knowledge of B3, D0 is behind node 410's knowledge of B6 and D2. When node 410 sends node 400 the changes between B6 and B3, and the changes between D2 and D0, it also sends along the latest version of knowledge $K_{N410}$ it has (reflecting whenever the last change on node 410 was made).

Figure 4C:
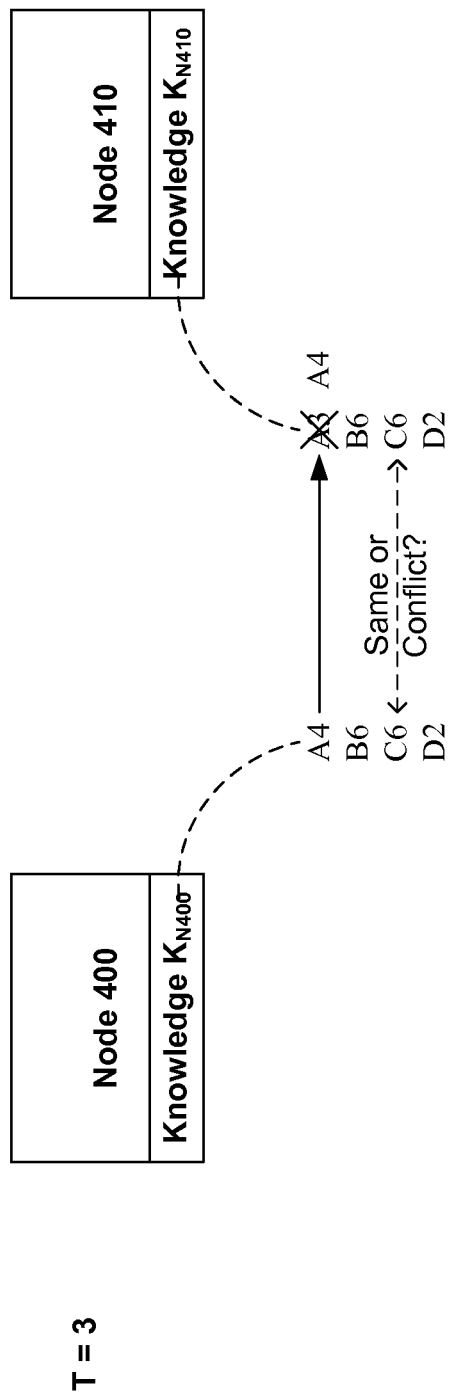

As shown in FIG. 4C, representing time t=3, sending knowledge $K_{N410}$ to node 400 allows node 400 to detect conflicts (e.g., store them for later resolution) if it later finds out that both node 400 and node 410 made a change to an object while they were on the same version. This allows for autonomous updating, efficient enumeration, but also correct conflict detection when the nodes meet and exchange changes. For instance, in the example, if C6 is not the same object in both knowledge $K_{N410}$ and $K_{N410}$, e.g., if both independently evolved from C5 to C6, then which C6 is the correct C6 can be set aside for conflict resolution, e.g., according to pre-set policy resolution that befits the synchronization scenario and devices involved.

Figure 5A:
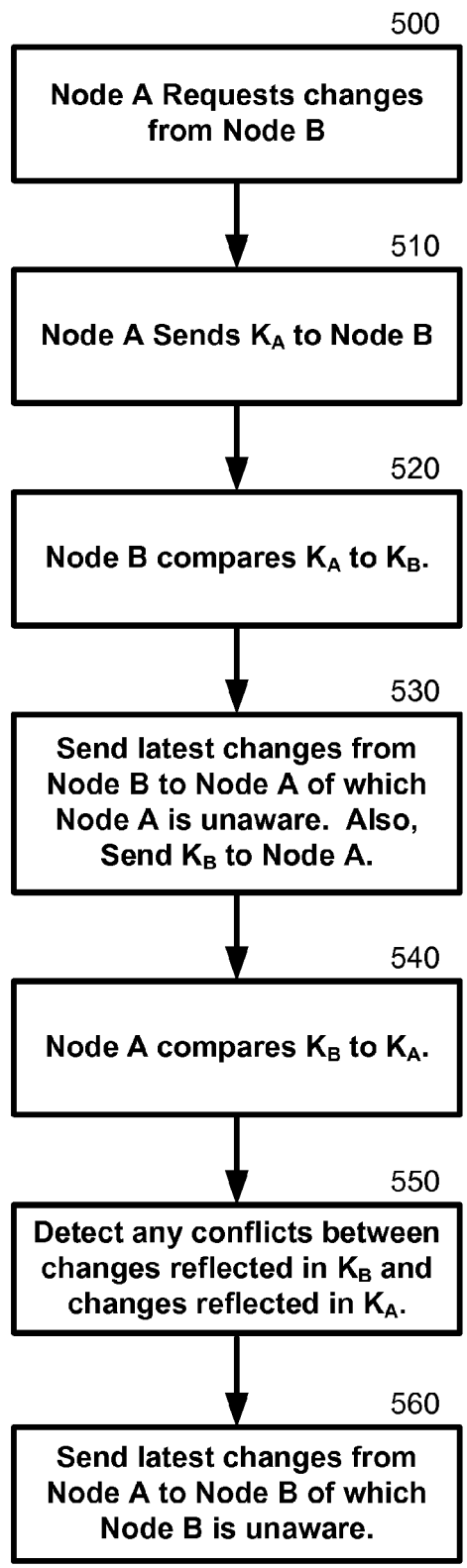
FIG. 5A is an exemplary non-limiting flow diagram illustrating the process for knowledge exchange in the context of multiple objects shared among nodes of a network.

An exemplary knowledge exchange process between any two nodes of a distributed multi-master synchronization environment using the above described general mechanism is shown in the flow diagram of FIG. 5A. At 500, node A requests synchronization with node B, thereby asking node B for changes node A does not know about. In order to equip node B, at 510, node A sends its knowledge to node B. At 520, node B compares the knowledge received from node A with its own knowledge to determine what changes node B knows about that should be sent to node A. At 530, node B sends such changes to node A, and in addition, node B sends its knowledge to node A so that node A can perform a similar knowledge comparison at 540.

At 550, node A detects any potential conflicts between latest versions reflected in the knowledge of node B and latest versions reflected in the knowledge of node A, in the event that independent evolution of versions has occurred on node A and node B. Optionally, any conflict resolution policy may be applied to determine which node trumps the other node in the event of a conflict. At 560, the latest changes from node A that are not possessed by node B are sent to node B. The conflict resolution policy will additionally dictate whether any changes are sent from node B to node A, or node A to node B, to maintain common information between the nodes. If independent versioning is OK, or desirable, no conflict resolution is another option.

Figure 5B:
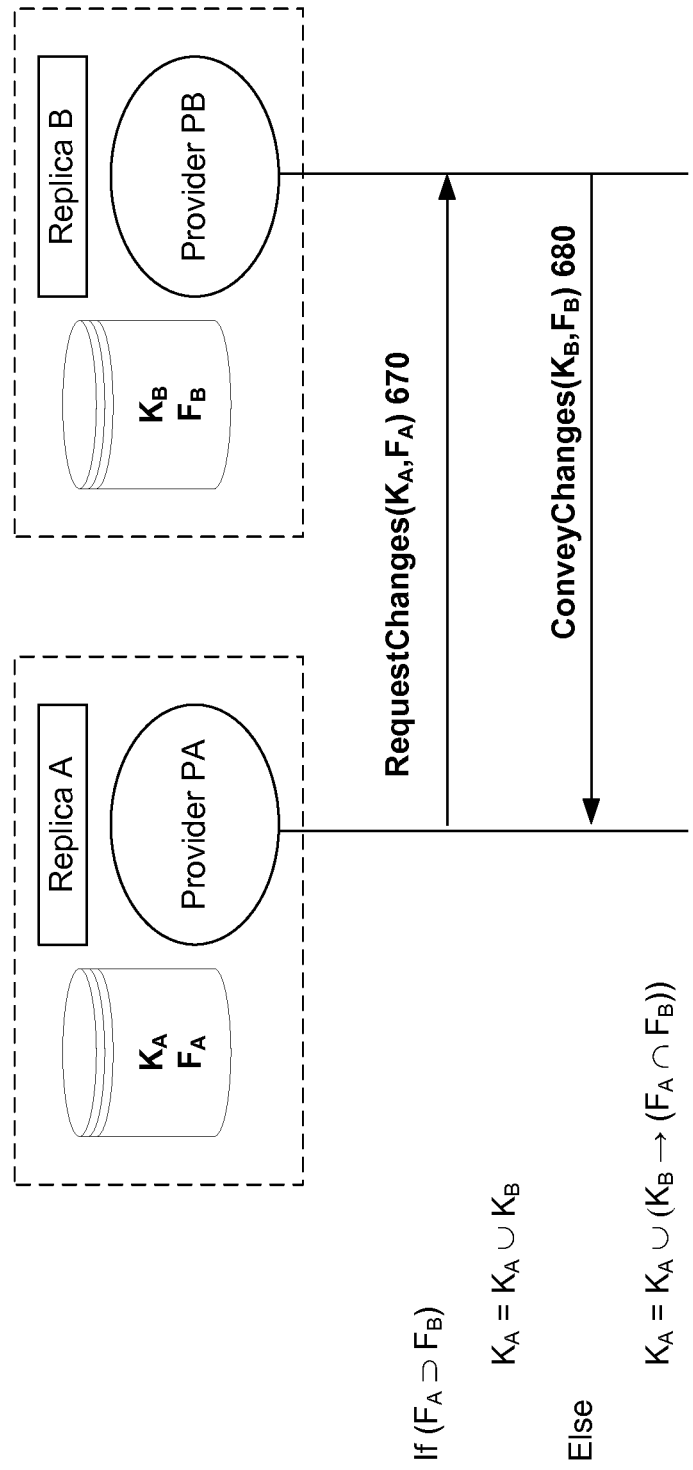
FIG. 5B is a general architecture illustrating the framework for requesting and conveying changes based on knowledge and partial knowledge.

FIG. 5B illustrates the generalized mechanism for exchanging knowledge when filtered knowledge is possible, i.e., where a subset of a node's knowledge is to be synchronized with one or more of the other nodes. As shown, each replica A and B has provider PA and provider PB, respectively. In this regard, each replica A and B maintains knowledge $K_A$ and $K_B$, respectively, and potentially also maintains filtered knowledge $F_A$ and $F_B$. Similar to the case with no subsetting, any of the replicas can request changes 570 of another replica and receive changes 580 in response to the other replica conveying changes. If the filtered knowledge $F_A$ and filtered knowledge $F_B$ are of the same scope, then as with the generalized knowledge exchange:

$$K_A = K_A \cup K_B$$

If the filtered knowledge $F_A$ and filtered knowledge $F_B$ are not of the same scope, then instead the knowledge is a function of existing knowledge plus the knowledge of the other replica as projected onto the intersection of their respective Filters $F_A$ and $F_B$, as follows:

$$K_A = K_A \cup (K_B \to (F_A \cap F_B))$$

Among other applications, an exemplary, non-limiting application for these types of filters is for filtering columns, or any change units of a synchronization framework. This is particularly applicable since column changes are not likely to be subject to move operations in the system. There are two considerations for this scenario worth noting: filter representation and knowledge consolidation.

With respect to filter representation, filter representation for the case of no move filters is as follows. Each filter is represented as a list of the change units contained within the filter. This representation provides a convenient means of representation as well as the ability to combine filters when necessary. The ability to combine filters is useful for consolidating knowledge.

With respect to knowledge consolidation, in order to keep knowledge in its most concise form the ability to consolidate knowledge must be maintained. In this regard, fragments of filtered knowledge can be consolidated so that knowledge can be maintained in its most compact form.

Considering the ability to combine filters, since filters can be represented as a set of change units, overlaps in filters can be reconciled by isolating the sets of change units that exist in both filters.

Also, since the vector for a filter applies to each of the individual change units within the filter, the combination of the filters can be performed by finding the combined vector for the change unit for each change unit in both filters. Then once all of the vectors are known, the change units that have a common vector are recombined into a new filter.

Accordingly, the notion of knowledge can be used to efficiently represent data for knowledge exchanges among multiple nodes of a multi-master synchronization network, any node of which may independently evolve common information, or subsets of common information, to be synchronized across the nodes. As described in more detail below, the above-described knowledge based framework is extendible to a multi-master synchronization environment including Web service endpoint(s).

Synchronization of Web Service Endpoints in a Multi-Master Synchronization Environment As mentioned, today, a variety of non-interoperable data synchronization products exist, each connecting data from a few types of data repositories to a few devices. Each protocol functions only for selected transports, and is implemented on a few devices. In this regard, existing synchronization products use different and diverse communication protocols over the network. The proliferation of non-interoperable synchronization technologies complicates the tasks of users, device manufacturers, service providers, and application developers. The lack of a common data synchronization protocol is impeding growth in use of mobile devices, restricting users' ability to access data, and limiting the delivery of mobile data services.

Accordingly, a Web service (WS) synchronization protocol is provided that sets forth the structure for metadata and the protocol by which endpoints roam, share and synchronize in a multi-master ecosystem. Using XML Web services, the protocol allows devices, services, and applications to synchronize through firewalls and also allows for extensibility by not prescribing the schema of the actual data being synchronized. The invention also enables a variety of communication scenarios for flexible messaging over Web services depending on the goals of the nodes and symmetry of communications, e.g., pull, push or ping to pull messaging scenarios. This also includes scenarios involving prerequisite synchronization knowledge.

Figure 6:
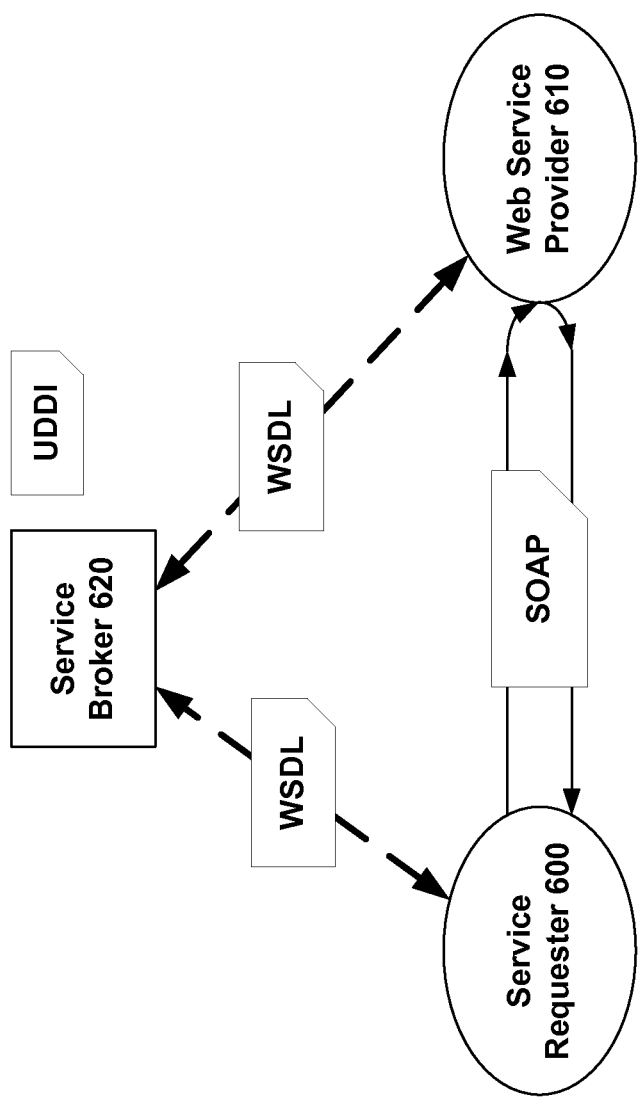
FIG. 6 is a general architecture for Web services communications by nodes and/or Web service providers in accordance with non-limiting embodiments of a Web service synchronization protocol of the invention.

While Web services generically refers to any software system(s) designed to support interoperable machine to machine interaction over a network, Web services commonly refers to clients and servers that communicate using extensible markup language (XML) messages that follow the simple object access protocol (SOAP) standard. This is illustrated generally in FIG. 6 as between service requester 600 (e.g. a client) and Web service provider 610 (e.g., a server) beginning with a SOAP request from the service requester 600, the request being handled by Web service provider 610, and returning any SOAP messages in response according to Web service communication protocols.

Additionally, it is typical of Web services definitions to include a machine readable description of the operations supported by the Web service provider 610, a description in the Web Services Description Language (WSDL), so that a service requester 600 can understand the services provided by the Web service. A service broker 620 can include descriptions of various Web service providers 610 and Universal Description, Discovery and Integration (UDDI) can be used to publish service listings for discovery by service requesters 600 over networks. UDDI is one of the core Web services standards providing access to WSDL documents describing the protocol bindings and message formats required to interact with the web services listed in its directory.

Thus, a WS synchronization protocol for synchronizing data between two endpoints is provided where at least one of the endpoints supports a Web service. In various non-limiting embodiments, the invention provides a general SOAP-based protocol for synchronizing data between two endpoints where at least one of the endpoints supports a Web service.

First, some notations, namespaces and terminology are set forth for the various non-limiting embodiments of the WS synchronization protocol of the invention. In this regard, the following syntax is used herein to define normative outlines for messages according to the exemplary non-limiting protocol specification presented below:

Below, syntax is represented as an XML instance. Characters are appended to elements and attributes to indicate cardinality, as follows:

"?" (0 or 1)
"*" (0 or more)
"+" (1 or more)

The character "|" is used to indicate a choice between alternatives. The characters "[" and "]" are used to indicate that contained items are to be treated as a group with respect to cardinality or choice.

An ellipsis, i.e., " . . . ", indicates a point of extensibility that allows other child or attribute content. Additional children and/or attributes may be added at the indicated extension points but should avoid contradicting the semantics of the parent and/or owner, respectively. If a receiver does not recognize an extension, the receiver should avoid processing the message and may fault.

XML namespace prefixes are used to indicate the namespace of the element being defined. In one embodiment, a SOAP node does not use an XML namespace identifier within SOAP envelopes unless it complies with the protocol as defined in various non-limiting embodiments of the invention.

Different types of data exchanges can be defined for different synchronization goals, e.g., pulling changes from a remote endpoint and pushing changes to a remote endpoint. While the scenario may exist where two endpoints in a synchronization exchange can communicate symmetrically, the various non-limiting embodiments of the protocol of the invention is mainly applicable to situations where only one of the endpoints exposes a Web service.

Pulling changes generally refers to a scenario where a client wishes to obtain data from a Web service host in order to obtain the knowledge of the Web service host.

Pushing changes generally refers to a scenario where a client wishes to send its knowledge it has maintained locally to a Web Service.

Combining pushing and pulling scenarios results in a full knowledge share between the client and Web service endpoint. The scenarios may also include a notion of sending prerequisite knowledge along with a set of changes that have been made that are predicated on the prerequisite knowledge.

As described above, knowledge is the 'water mark' for change enumeration. Unlike anchors common to many synchronization systems, as described above for generic knowledge exchanges among nodes, knowledge is well defined and may be interpreted by any party involved in the synchronization. Furthermore, since techniques are defined to accurately combine knowledge, it is not necessary to keep an instance of knowledge for every partner synchronized. Rather, each endpoint keeps its own local knowledge and merely adds to its local knowledge whenever it receives changes from a remote endpoint. Advantageously, the protocol can be used where the remote endpoint supports a Web service.

Figure 7A:
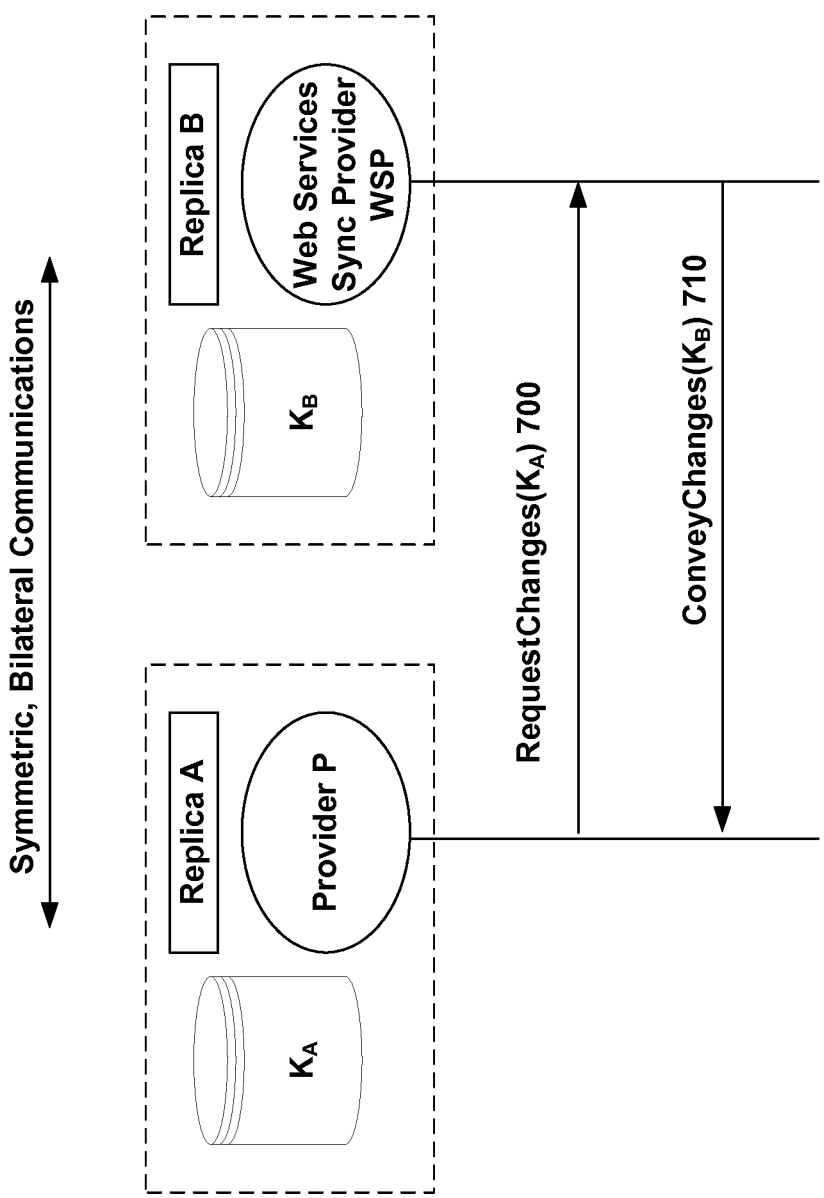
FIGS. 7A, 7B, 7C and 7D illustrate different knowledge exchange messaging patterns that can be implemented with flexible Web services synchronization protocol communications of non-limiting embodiments of the invention.

As shown in the block diagram of FIG. 7A, advantageously, an embodiment the Web services synchronization protocol supports a variety of messaging patterns for exchanging knowledge in a multi-master synchronization environment leveraging the concepts of an efficient knowledge exchange as described above. In a first scenario, symmetric bilateral communications are assumed between a generic provider P of a node maintaining a replica A and knowledge $K_A$ of replica A and a Web services sync provider WSP of a Web services endpoint maintaining a replica B and knowledge $K_B$ of replica B. When communications are not "blocked" one way or another, a knowledge exchange ensues by the provider P requesting changes including sending its knowledge to Provider WSP at 700. In turn, provider WSP conveys changes to provider P based on the request at 710 including sending its knowledge to Provider P. Any of the messaging scenarios herein can apply from the node side or the Web service endpoint side, i.e., either side can make a request, though with Web services communications, it is noted the client must initiate synchronization requests whether pull or push operations.

Figure 7B:
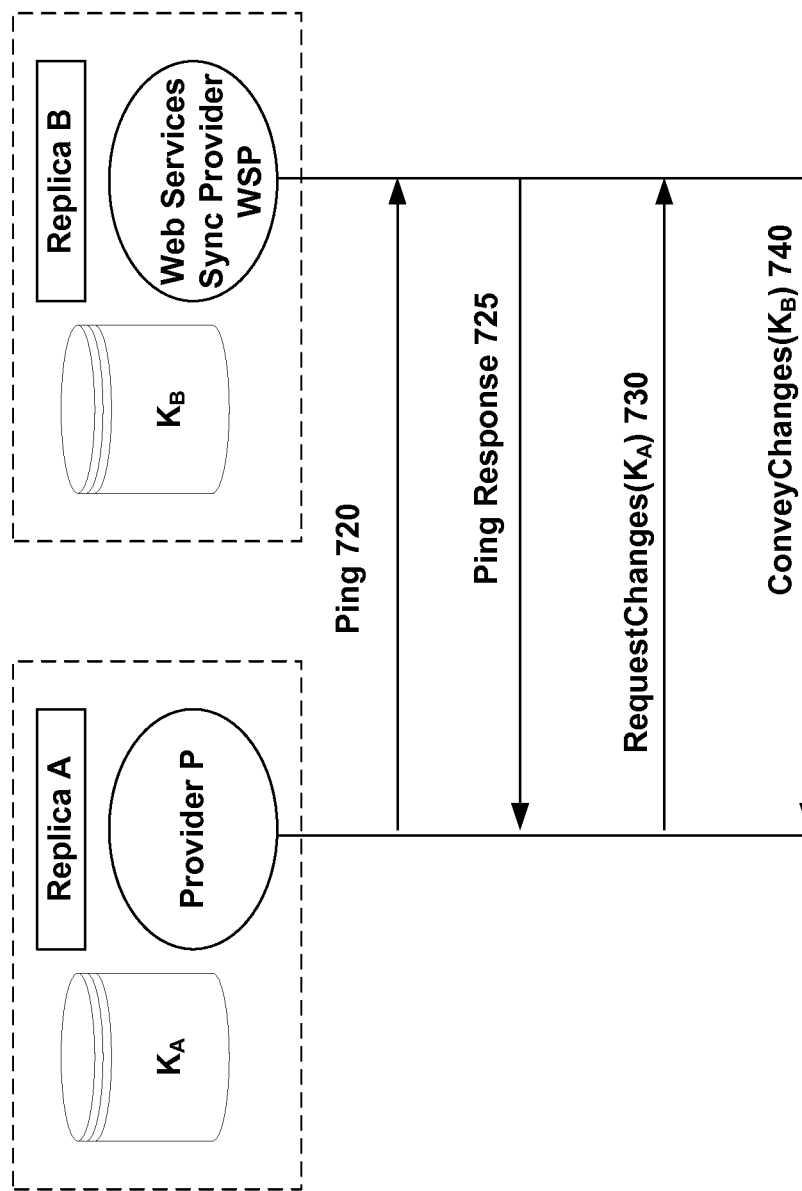

As shown in FIG. 7B, another scenario is a "ping-to-pull" scenario. Rather than send the knowledge directly as part of an initial request, which can waste network bandwidth if unnecessary a ping 720 is performed from provider P to Web services provider SP, or vice versa, whereby the provider WSP then determines whether any updates to its knowledge have occurred since a previous synchronization point. If so, then the provider P is so informed and a knowledge exchange ensues according to steps 730 and 740 as with FIG. 7A.

Figure 7C:
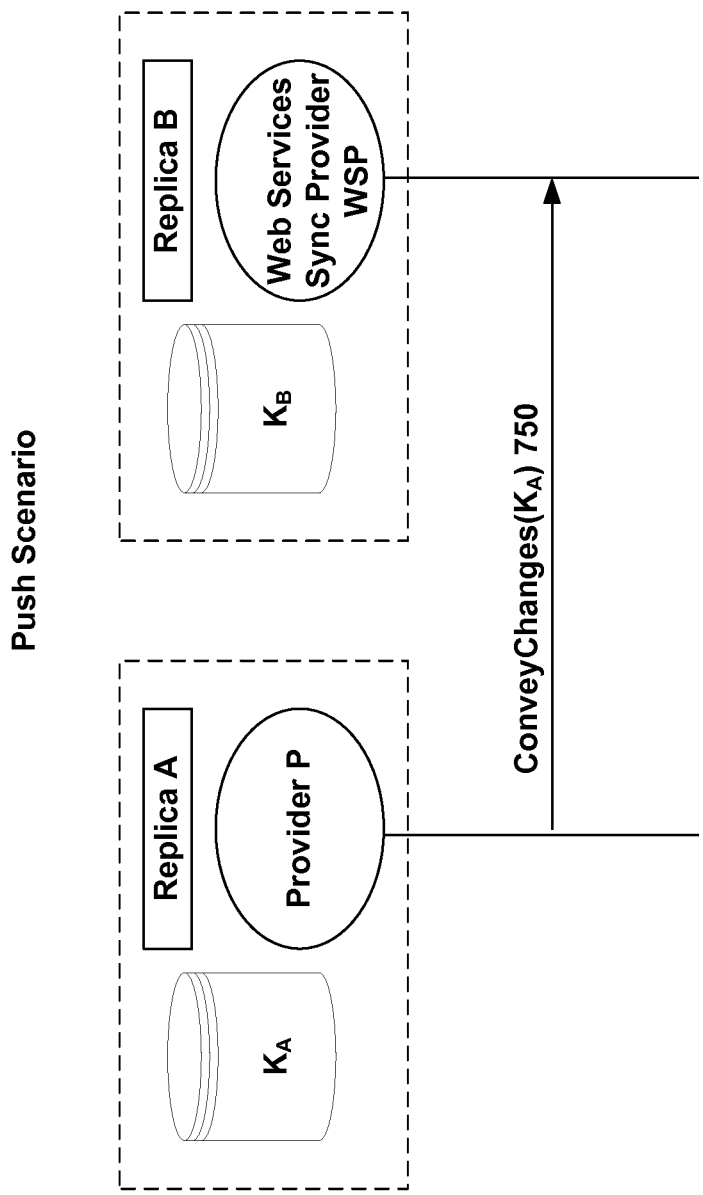

Another scenario, the push scenario, is depicted in FIG. 7C. In a blind push, perhaps because of a trusted relationship, or other reason, the node simply pushes its changes to the Web services endpoint provider WSP according to some predetermined criterion, e.g., whenever a change occurs, whenever a batch of changes occurs, periodically, etc. In this regard, provider P provides its knowledge $K_A$ to provider WSP at 750 and the Web services endpoint either can incorporate the knowledge $K_A$ into its knowledge $K_B$ or the Web services endpoint disregards the attempt to convey changes if the knowledge is not new.

Figure 7D:
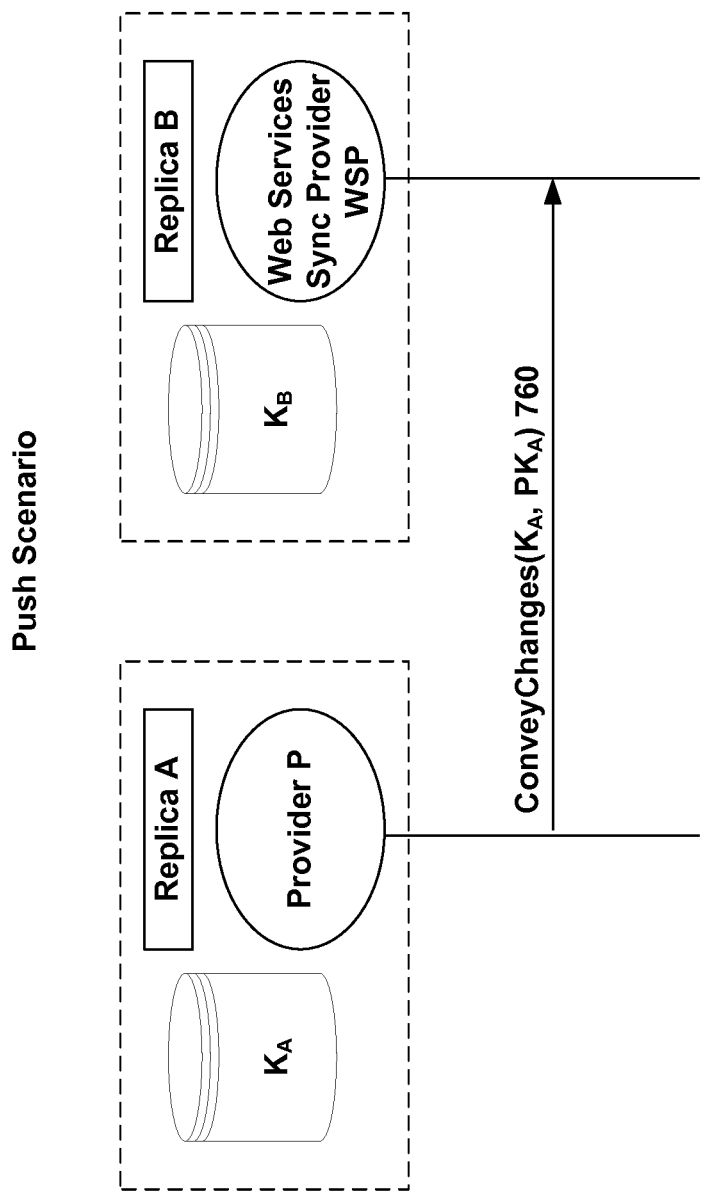

In yet another messaging scenario, shown in FIG. 7D, instead of a blind push, provider P instead conveys its knowledge $K_A$ and a set of prerequisite knowledge $PK_A$ that must be understood by provider WSP, or vice versa, in order to consume the knowledge $K_A$ for valid synchronization purposes. Accordingly, the synchronization communications are conditional on the recipient having a certain amount of knowledge already, or else the data is discarded. At that point, a full knowledge exchange may be required to synchronize with one another.

Having presented an overview of the operations on knowledge according to a synchronization framework for efficient representation of synchronization data a multi-master environment and various techniques for manipulating knowledge in the foregoing section and under different messaging scenarios, an exemplary, non-limiting implementation of the Web service synchronization protocol is now presented. With the Web service synchronization protocol, knowledge can be represented according to the following exemplary XML pseudo-structure.

```
<Knowledge>
    <ScopeVector>
        <VectorEntry by="..." sn="..."/>
        <VectorEntry by="..." sn="..."/>
        <VectorEntry by="..." sn="..."/>
    </ScopeVector>
    <RangeExceptio ns>
        <Range lowerBound="..." upperBound="...">
            <VectorEntry by="..." sn="..."/>
            <VectorEntry by="..." sn="..."/>
            <VectorEntry by="..." sn="..."/>
        </Range>
        <Range>
            ...
        </Range>
    </RangeExceptions>
    <ItemExceptions>
        <Item id="...">
            <ItemVector>
                <VectorEntry by="..." sn="..."/>
                <VectorEntry by="..." sn="..."/>
                <VectorEntry by="..." sn="..."/>
            </ItemVector>
        </Item>
        <Item id="...">
            <ChangeUnits>
                <Unit id="...">
                    <VectorEntry by="..." sn="..."/>
                    <VectorEntry by="..." sn="..."/>
                    <VectorEntry by="..." sn="..."/>
                </Unit>
                <Unit id="...">
                    ...
                </Unit>
            </ChangeUnits>
        </Item>
    </ItemExceptions>
</Knowledge>
```

The /Knowledge/ScopeVector in the XML representation contains the VectorClock that is applied to all items in the data set that contain a specific override.

/Knowledge/RangeExceptions is a list of ranges with VectorClocks that should override the ScopeVector.

/Knowledge/RangeExceptions/Range:lowerBound in turn is the smallest item contained within the range.

/Knowledge/RangeExceptions/Range:upperBound represents the smallest item larger than the lowerBound that is not contained in the range.

/Knowledge/RangeExceptions/Range is a VectorClock that should be used for the range.

/Knowledge/ItemExceptions represents a list of items with either a VectorClock that should override the ScopeVector or a set of ChangeUnits with an overriding VectorClock.

/Knowledge/ItemExceptions/Item represents the item specified by its identifier to which the exception applies.

/Knowledge/ItemExceptions/Item/ItemVector is a VectorClock that overrides any scope or range vector that would also apply to the item.

/Knowledge/ItemExceptions/Item/ChangeUnits, if present, represents a list of change units contained within an item and an overriding VectorClock applying to that change unit. Change units can be, for instance, properties of an item. They can be set/cleared but conform to a schema and cannot be deleted.

/Knowledge/ItemExceptions/Item/ChangeUnits/Unit specifies the identifier and VectorClock that overrides any scope, range, or item vector that would also apply to the change unit.

A change batch is a grouping of changes that are communicated between two synchronizing parties, and takes the following XML pseudo-structure.

```
<ChangeBatch>
    <PrerequisiteKnowledge>
    ...
    </PrerequisiteKnowledge>
    <ChangeSet>
        <MadeWithKnowledge>
        ...
        </MadeWithKnowledge>
        <Changes>
            <Change>
                <ItemId>
                    <wsu:Address>
                        http://target/uri
                    </wsu:Address>
                </ItemId>
                <IsTombstone> Boolean </IsTombstone>
                <BeginsRange> Boolean </BeginsRange>
                <CreationVersion by="..." sn="..."/>
                <UpdateVersion by="..." sn="..."/>
                <ChangeUnits>
                    <Unit>
                        <UnitId>
                            <wsu:Address>
                                http://target/uri
                            </wsu:Address>
                        </UnitId>
                        <UpdateVersion .../>
                    </Unit>
                    ...
                </ChangeUnits>
            </Change>
        </Changes>
    </ChangeSet>
    ...
    <MoreDataIsAvailable> Boolean </MoreDataIsAvailable>
</ChangeBatch>
```

In the above change batch pseudo-structure, /ChangeBatch/PrerequisiteKnowledge specifies a knowledge that is a prerequisite for the current batch of changes. This knowledge is subsumed by the knowledge of the endpoint receiving the changes.

/ChangeBatch/ChangeSet is a set of changes in the batch that share a Made With Knowledge.

/ChangeBatch/ChangeSet/MadeWithKnowledge is the knowledge that applies to the change set. It is used for conflict detection as well as to generate the knowledge fragment that can be added to the knowledge of the endpoint receiving the ChangeBatch.

/ChangeBatch/ChangeSet/Changes is the list of changes.

/ChangeBatch/ChangeSet/Changes/Change describes an individual change of /ChangeBatch/ChangeSet/Changes.

/ChangeBatch/ChangeSet/Changes/Change/ItemId is the sync identifier for the item being sent. Providers can also optimize by including the actual data in this message (link or embedded) using the Address element /ChangeBatch/ChangeSet/Changes/Change/IsTombstone is a flag indicating whether this is metadata representing an item that has been deleted.

/ChangeBatch/ChangeSet/Changes/Change/BeginsRange is a flag indicating whether this item is the first in a continuous sequence of items.

/ChangeBatch/ChangeSet/Changes/Change/CreationVersion is the version that the item was given when it entered the scope.

/ChangeBatch/ChangeSet/Changes/Change/UpdateVersion, if present, is the version of the item being communicated in this change batch.

/ChangeBatch/ChangeSet/Changes/Change/ChangeUnits, if present, is a list of change units contained within the item.

/ChangeBatch/ChangeSet/Changes/Change/ChangeUnits/Unit describes a specific change unit within the item.

/ChangeBatch/ChangeSet/Changes/Change/ChangeUnits/Unit/UnitId is the identifier for the change unit. Similar to the Change/ItemId field, this can be used to either embed or link the data using the Address element.

/ChangeBatch/ChangeSet/Changes/Change/ChangeUnits/Unit/Update Version is the version of the change unit within the item being communicated in this change batch.

/ChangeBatch/MoreDataIsAvailable is a flag that indicates that all changes known to the source between the PrerequisiteKnowledge and the MadeWithKnowledge are contained within the batch.

With respect to messaging of the synchronization protocol, a GetKnowledge message is a message that can be sent by device nodes to the Web service endpoint to obtain a copy of the current knowledge of the service, and has the following exemplary XML pseudo-structure.

```
<GetKnowledge>
    <ScopeReplica>
        http://scope/replica/uri
    </ScopeReplica>
</GetKnowledge>
/GetKnowledge/ScopeReplica
```

GetKnowledge defines information relevant to the service that allows the service to identify the target data to be synchronized. Web service providers use the URI to fully resolve the logical set of items being synchronized, e.g., "4-star music", "Videos", "Public Contacts", etc.

The GetKnowledgeResponse message is the response to from the Web service to the GetKnowledge message, containing a snapshot of the knowledge for the service, and has the following exemplary XML pseudo-structure.

```
<GetKnowledgeResponse>
    <ScopeReplica>
        http://scope/replica/uri
    </ScopeReplica>
    <Knowledge>
        ...
    </Knowledge>
</GetKnowledgeResponse>
```

/GetKnowledgeResponse/ScopeReplica defines information relevant to the service that allows it to identify the target data to be synchronized.

/GetKnowledgeResponse/Knowledge is the Knowledge of the service for the given Scope-Replica.

The RequestChanges message is sent to the Web service to request that the service enumerate a batch of changes and return it, and has the following exemplary XML pseudo-structure.

```
<RequestChanges>
    <ScopeReplica>
        http://scope/replica/uri
    </ScopeReplica>
    <Knowledge>
        ...
    </Knowledge>
    <RequestParams
        EnumerateAllItemsOnForgottenKnowledgeFailure=true>
</RequestChanges>
```

/RequestChanges/ScopeReplica defines information relevant to the service that allows it to identify the target data to be synchronized.

/RequestChanges/Knowledge is the Knowledge of the client that the service should as a basis to enumerate changes.

/RequestChanges/RequestParams/EnumerateAllItemsOnForgottenKnowledgeFailure is a flag that indicates, if the client's knowledge fails to subsume the forgotten knowledge of the server, that the server should enumerate all items in its store allowing the client to cleanup deleted items.

The RequestChangesResponse message is the response to RequestChanges, containing a change batch with all of the changes within the batch. The PrerequisiteKnowledge within the ChangeBatch is the knowledge that was sent as part of the RequestChanges message.

```
<RequestChangesResponse>
    <ScopeReplica>
        http://scope/replica/uri
    </ScopeReplica>
    <ChangeBatch>
        ...
    </ChangeBatch>
    <FullItemSetEnumerated> Boolean </FullItemSetEnumerated>
    <ForgottenKnowledge>
        ...
    </ForgottenKnowledge>
</RequestChangesResponse>
```

/RequestChangesResponse/ScopeReplica defines information relevant to the service that allows it to identify the target data to be synchronized.

/RequestChangesResponse/ChangeBatch is a batch of the changes identified by the service that need to be returned to the client.

/RequestChangesResponse/FullItemSetEnumerated is a flag indicating that the change batch contains a full enumeration of items in the Scope-Replica of the service due to a forgotten knowledge check failure.

In the case of a full enumeration, /RequestChangesResponse/ForgottenKnowledge is the forgotten knowledge of the service that should be learned by the client with the batch of changes.

The ConveyChanges message is sent to the service when a set of changes is being pushed to the service. The knowledge that is sent in the ChangeBatch is the knowledge that was used for enumeration. It could have been obtained by either a call to GetKnowledge or as a cached copy obtained through previous sync messages, and takes the following exemplary XML pseudo-structure.

```
<ConveyChanges>
    <ScopeReplica>
        http://scope/replica/uri
    </ScopeReplica>
    <ChangeBatch>
        ...
    </ChangeBatch>
    <ForgottenKnowledge>
        ...
    </ForgottenKnowledge>
    <FullItemSetEnumerated> Boolean </FullItemSetEnumerated>
</ConveyChanges>
```

/ConveyChanges/ScopeReplica defines information relevant to the service that allows it to identify the target data to be synchronized.

/ConveyChanges/ChangeBatch is a batch of the changes identified by the client that need to be applied to the service.

/ConveyChanges/FullItemSetEnumerated is a flag indicating that the change batch contains a full enumeration of items in the Scope-Replica of the client due to a forgotten knowledge check failure.

In the case of a full enumeration, /ConveyChanges/ForgottenKnowledge is the forgotten knowledge of the client that should be learned by the service with the batch of changes.

The ConveyChangesResponse message is the response to the ConveyChanges message, containing the knowledge on the Web service as a result of the application of changes, and has the following exemplary XML pseudo-structure.

```
<ConveyChangesResponse>
    <ScopeReplica>
        http://scope/replica/uri
    </ScopeReplica>
    <ResultingKnowledge>
        ...
    </ResultingKnowledge>
</ConveyChangesResponse>
```

/ConveyChangesResponse/ScopeReplica defines information relevant to the service that allows it to identify the target data to be synchronized.

/ConveyChangesResponse/ResultingKnowledge is the knowledge of the service after application of the conveyed change batch.

A Web service synchronization protocol is thus provided that sets forth the metadata and messaging by which endpoints roam, share and synchronize common information with one another in a multi-master networked computing ecosystem.

A general SOAP-based protocol is defined for synchronizing data between two endpoints where one or more of the endpoints supports a Web service. Defining messaging for knowledge-based transfers using XML Web services, the protocol allows devices, services and applications to synchronize through firewalls, allows for flexibility by allowing any common set or subset of information across endpoints and allows for extensibility by not prescribing the schema of the actual data being synchronized at the endpoints.

Figure 8:
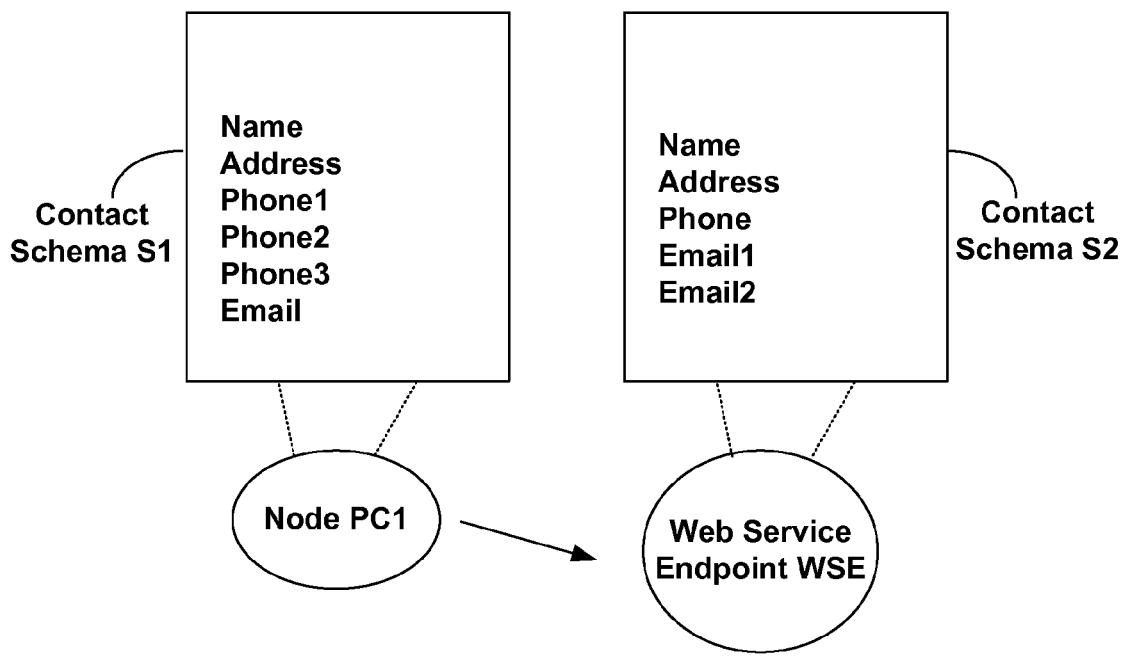
FIG. 8 illustrates an example where two different versions of knowledge are represented according to different schema, but synchronized according to a common representation of knowledge as enabled by partial knowledge representations in accordance with non-limiting embodiments of the invention.

FIG. 8 illustrates that the knowledge based framework for synchronizing sets or subsets of common information among nodes and/or Web service endpoints in a multi-master synchronization environment enables the nodes and/or Web service endpoints to store the same data with different schema. While the different endpoints must negotiate a common representation for schema elements being synchronized, i.e., the synchronization protocol is data type agnostic in terms of its representation of knowledge and thus each node can store the underlying schema elements according to its own wishes.

As illustrated a node, e.g., PC1 may include a first schema S1 for representing contact objects whereas a Web service endpoint WSE may store contact objects according to a different schema S2. In this regard, because the efficient representation of knowledge is not dependent on the type of data being synchronized, different devices can make different decisions about which knowledge, e.g., which subsets of knowledge to consume.

Figure 9:
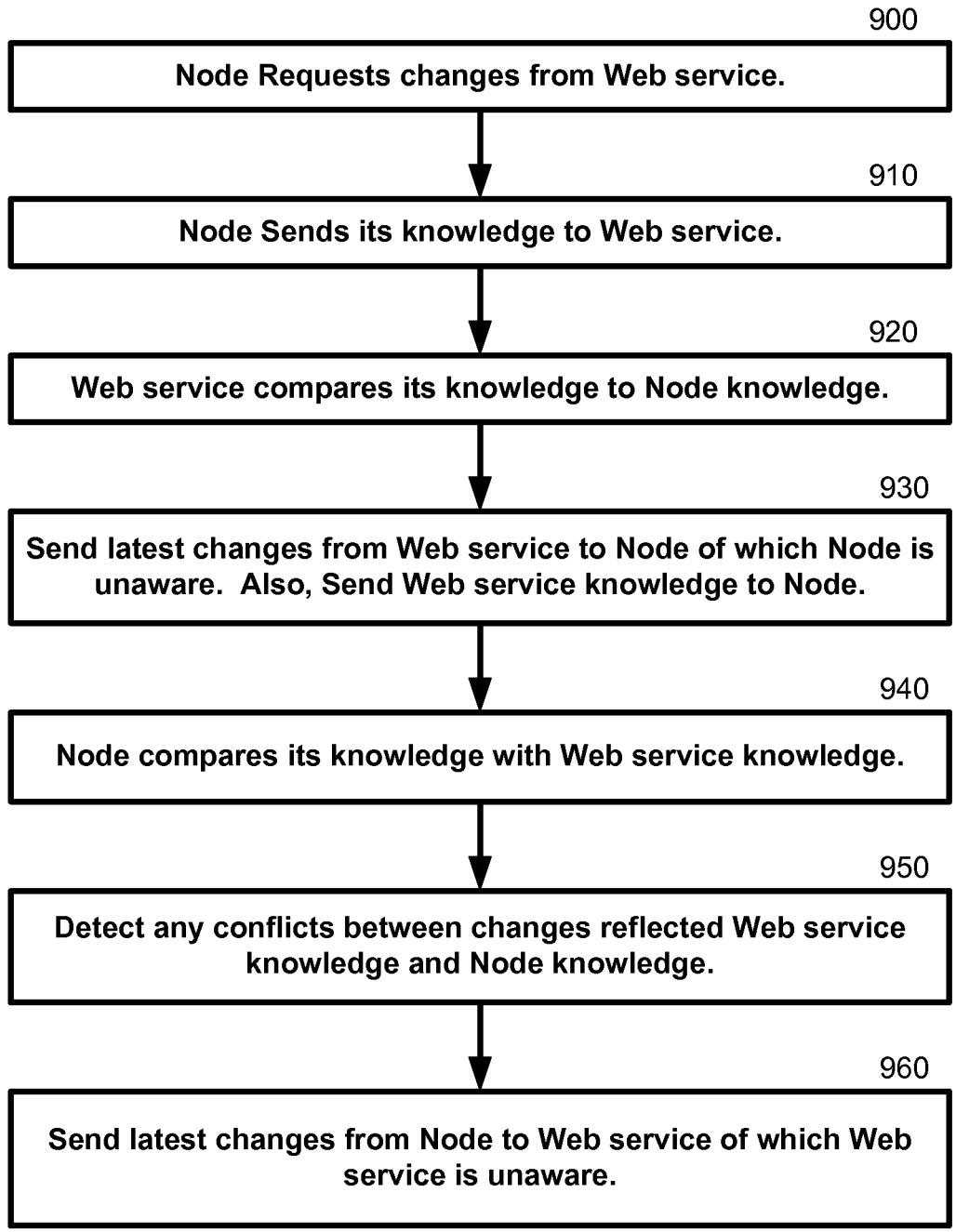
FIG. 9 is an exemplary non-limiting flow diagram illustrating the process for knowledge and/or partial knowledge exchange in the context of multiple objects shared among nodes and/or a Web service endpoint of a network in accordance with non-limiting embodiments of the invention.

FIG. 9 is a flow diagram of an exemplary, non-limiting method for exchanging knowledge between a node and a Web service in accordance with non-limiting embodiments of the protocol of the invention. However, as made clear from FIGS. 7A, 7B, 7C and 7D, the invention is not limited to the full knowledge exchange pattern represented by FIG. 9, but rather ping to pull, pull and push scenarios, as well as prerequisite knowledge scenarios are all contemplated in accordance with a flexible synchronization protocol.

At 900, a node request changes from the Web service. At 910, the node sends its knowledge to the Web service. At 920, the Web service compares its knowledge to Node knowledge. At 930, the Web service sends the latest changes from the Web service to the node of which the node is unaware. Also, the node receives the knowledge of the Web service for a comparison to its own knowledge at 940. At 950, conflicts between any independently evolved changes in the node's knowledge and the Web service's knowledge are detected. Lastly, at 960, the latest changes are sent to the Web service from the node of which the Web service is unaware. The knowledge analysis thus enables an efficient knowledge exchange by only sending the changes that the other endpoint requests and does not have already.

Figure 10:
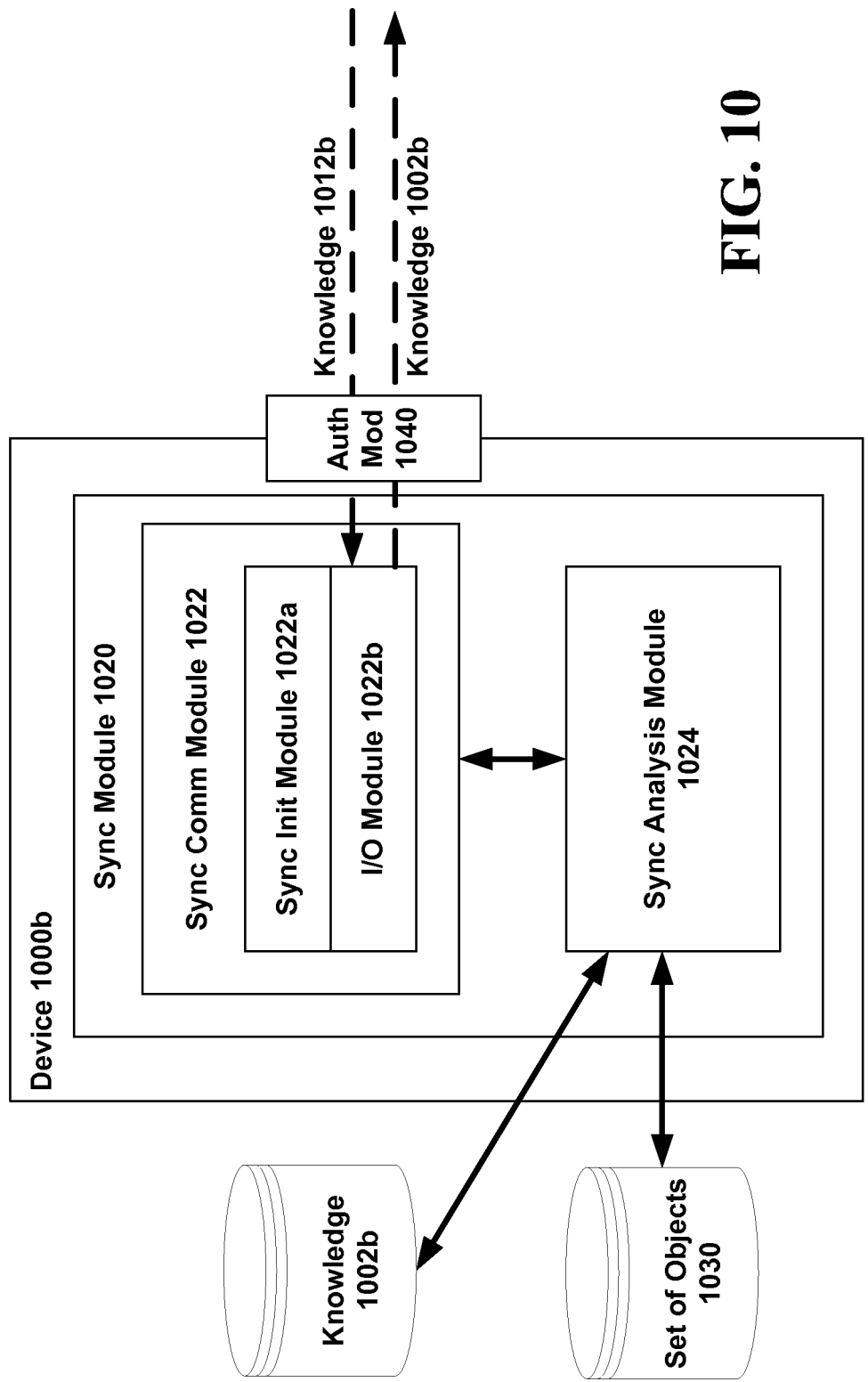
FIG. 10 is a block diagram of an exemplary non-limiting implementation of a device for performing a knowledge exchange with another node or Web service endpoint.

FIG. 10 is a block diagram of an exemplary non-limiting implementation of a device 1000b for performing a full or partial knowledge exchange. As shown, device 1000b includes a sync module 1020 that performs the full or partial knowledge exchange techniques for synchronizing a set of objects 1030 with another device in accordance with non-limiting embodiments of the invention. Sync module 1020 may include a sync communications module 1022 for generally transmitting and receiving data in accordance with the knowledge exchange techniques of non-limiting embodiments of the invention.

Sync communications module 1022 may also include a sync initiation module 1022a which may initiate synchronization with a second device if authorized, e.g., via authorization module 1040, and connect to the second device. Sync module 1020 may also include an I/O module 1022b responsive to the initiation of synchronization by sending full and/or partial knowledge 1002b about the set of objects 1030 to the second device (not shown) and for receiving back full and/or partial knowledge 1012b of the second device and changes to be made to the set of objects 1030 originating from the second device. In turn, a sync analysis module 1024 operates to apply the changes to be made to the set of objects 1030 and to compare full and/or partial knowledge 1012b from the second device with the full and/or partial knowledge 1002b of the first device in order to determine changes to send to the second device to complete synchronization between the devices.

Supplemental Context Regarding Web Services

The specifications that define Web services are intentionally modular, and as a result there is no one document that contains them all. Additionally, there is neither a single, nor a stable set of specifications. Generally speaking, there are a few "core" specifications that are supplemented by others as the circumstances and choice of technology dictate, including: XML, SOAP, WSDL and UDDI Simple Object Access Protocol (SOAP) is an XML-based, extensible message envelope format, with "bindings" to underlying protocols. SOAP is a protocol for exchanging XML-based messages over computer networks, normally using Hyper Text Transfer Protocol (HTTP)/HTTP Secure (HTTPS). SOAP forms the foundation layer of the Web services stack, providing a basic messaging framework that more abstract layers can build on.

There are several different types of messaging patterns in SOAP, but by far the most common is the Remote Procedure Call (RPC) pattern, in which one network node (the client) sends a request message to another node (the server), and the server immediately sends a response message to the client. Using SOAP over HTTP allows for easier communication behind proxies and firewalls than previous remote execution technology.

SOAP is versatile enough to allow for the use of different transport protocols. The standard stacks use HTTP as a transport protocol, but other protocols are also usable (TCP, SNMP).

WSDL is an XML format that allows service interfaces to be described, along with the details of their bindings to specific protocols and is typically used to generate server and client code, and for configuration.

Universal Description, Discovery and Integration (UDDI) is a protocol for publishing and discovering metadata about Web services, to enable applications to find Web services, either at design time or runtime. UDDI is an open industry initiative enabling businesses to publish service listings and discover each other and define how the services or software applications interact over the Internet. A UDDI business registration consists of three components:

White Pages—address, contact, and known identifiers;

Yellow Pages—industrial categorizations based on standard taxonomies;

Green Pages—technical information about services exposed by the business.

UDDI is one of the core Web services standards. It is designed to be interrogated by SOAP messages and to provide access to WSDL documents describing the protocol bindings and message formats required to interact with the web services listed in its directory.

Exemplary Networked and Distributed Environments

One of ordinary skill in the art can appreciate that the various non-limiting embodiments for synchronization knowledge representation and exchange with Web service endpoint(s) described above can be implemented in connection with any computer or other client or server device, which can be deployed as part of a computer network, or in a distributed computing environment, connected to any kind of data store. In this regard, the present invention pertains to any computer system or environment having any number of memory or storage units, and any number of applications and processes occurring across any number of storage units or volumes, which may be used in connection with synchronization techniques in accordance with the present invention. The present invention may apply to an environment with server computers and client computers deployed in a network environment or a distributed computing environment, having remote or local storage. The present invention may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the systems and methods for synchronizing in accordance with the invention.

Figure 11:
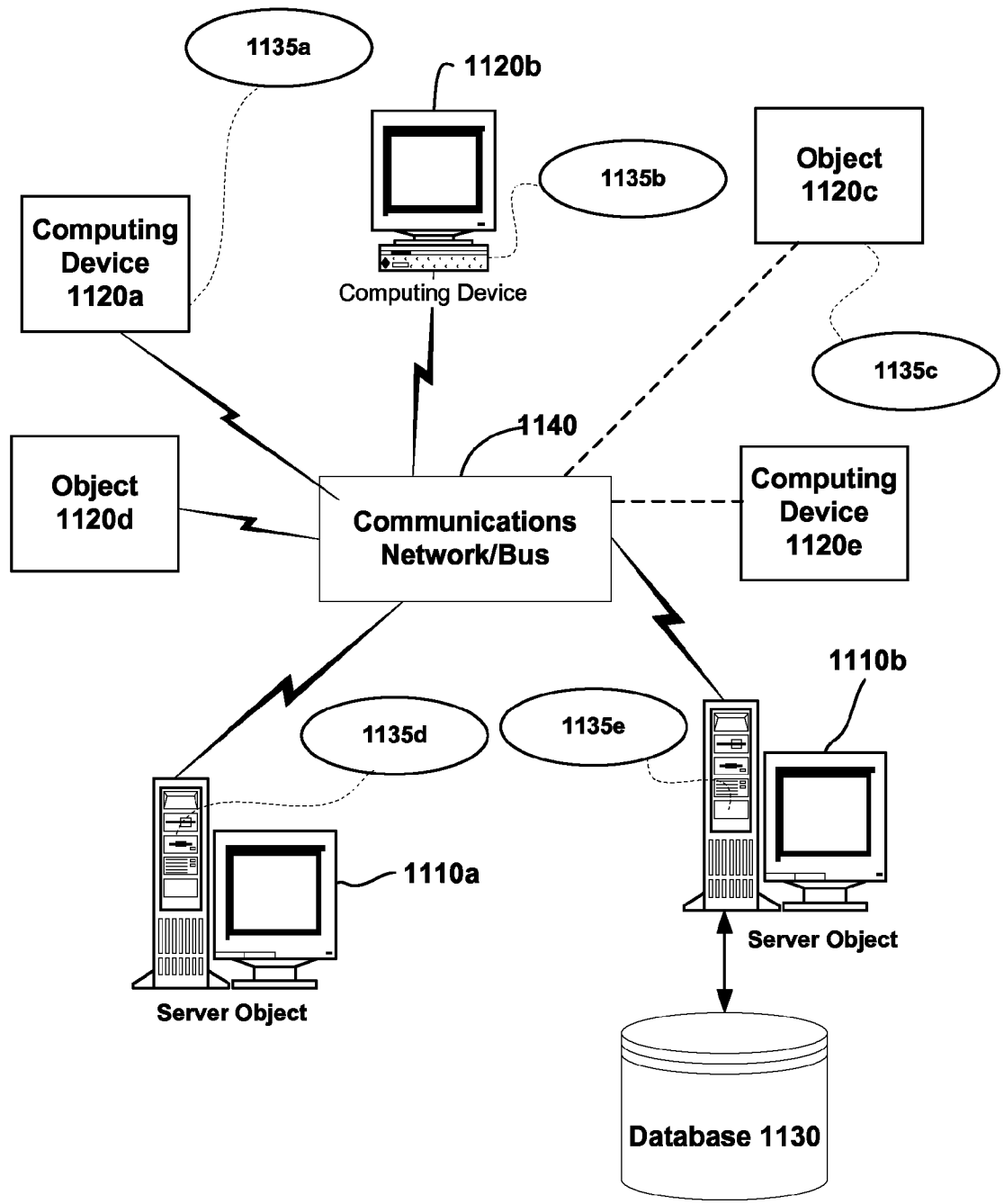
FIG. 11 is a block diagram representing an exemplary non-limiting networked environment in which the present invention may be implemented.

FIG. 11 provides a schematic diagram of an exemplary networked or distributed computing environment. The distributed computing environment comprises computing objects 1110a, 1110b, etc. and computing objects or devices 1120a, 1120b, 1120c, 1120d, 1120e, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 1140. This network may itself comprise other computing objects and computing devices that provide services to the system of FIG. 11, and may itself represent multiple interconnected networks. In accordance with an aspect of the invention, each object 1110a, 1110b, etc. or 1120a, 1120b, 1120c, 1120d, 1120e, etc. may contain an application that might make use of an API, or other object, software, firmware and/or hardware, suitable for use with the systems and methods for synchronizing with knowledge in accordance with the invention.

It can also be appreciated that an object, such as 1120c, may be hosted on another computing device 1110a, 1110b, etc. or 1120a, 1120b, 1120c, 1120d, 1120e, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to synchronizing according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, any of the computing devices of the present invention may share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 11, as an example, computers 1120a, 1120b, 1120c, 1120d, 1120e, etc. can be thought of as clients and computers 1110a, 1110b, etc. can be thought of as servers where servers 1110a, 1110b, etc. maintain the data that is then replicated to client computers 1120a, 1120b, 1120c, 1120d, 1120e, etc., although any computer can be considered a client, a server, or both, depending on the circumstances. Any of these computing devices may be processing data or requesting services or tasks that may implicate the synchronization techniques with knowledge in accordance with the invention.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for synchronizing based on knowledge in accordance with the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 11 illustrates an exemplary networked or distributed environment, with server(s) in communication with client computer (s) via a network/bus, in which the present invention may be employed. In more detail, a number of servers 1110a, 1110b, etc. are interconnected via a communications network/bus 1140, which may be a LAN, WAN, intranet, GSM network, the Internet, etc., with a number of client or remote computing devices 1120a, 1120b, 1120c, 1120d, 1120e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to synchronize any kind of data.

In a network environment in which the communications network/bus 1140 is the Internet, for example, the servers 1110a, 1110b, etc. can be Web servers with which the clients 1120a, 1120b, 1120c, 1120d, 1120e, etc. communicate via any of a number of known protocols such as HTTP. Servers 1110a, 1110b, etc. may also serve as clients 1120a, 1120b, 1120c, 1120d, 1120e, etc., as may be characteristic of a distributed computing environment.

As mentioned, communications may be wired or wireless, or a combination, where appropriate. Client devices 1120a, 1120b, 1120c, 1120d, 1120e, etc. may or may not communicate via communications network/bus 1140, and may have independent communications associated therewith. For example, in the case of a TV or VCR, there may or may not be a networked aspect to the control thereof. Each client computer 1120a, 1120b, 1120c, 1120d, 1120e, etc. and server computer 1110a, 1110b, etc. may be equipped with various application program modules or objects 1135a, 1135b, 1135c, etc. and with connections or access to various types of storage elements or objects, across which files or data streams may be stored or to which portion(s) of files or data streams may be downloaded, transmitted or migrated. Any one or more of computers 1110a, 1110b, 1120a, 1120b, 1120c, 1120d, 1120e, etc. may be responsible for the maintenance and updating of a database 1130 or other storage element, such as a database or memory 1130 for storing data processed or saved according to the invention. Thus, the present invention can be utilized in a computer network environment having client computers 1120a, 1120b, 1120c, 1120d, 1120e, etc. that can access and interact with a computer network/bus 1140 and server computers 1110a, 1110b, etc. that may interact with client computers 1120a, 1120b, 1120c, 1120d, 1120e, etc. and other like devices, and databases 1130.

Exemplary Computing Device

Figure 12:
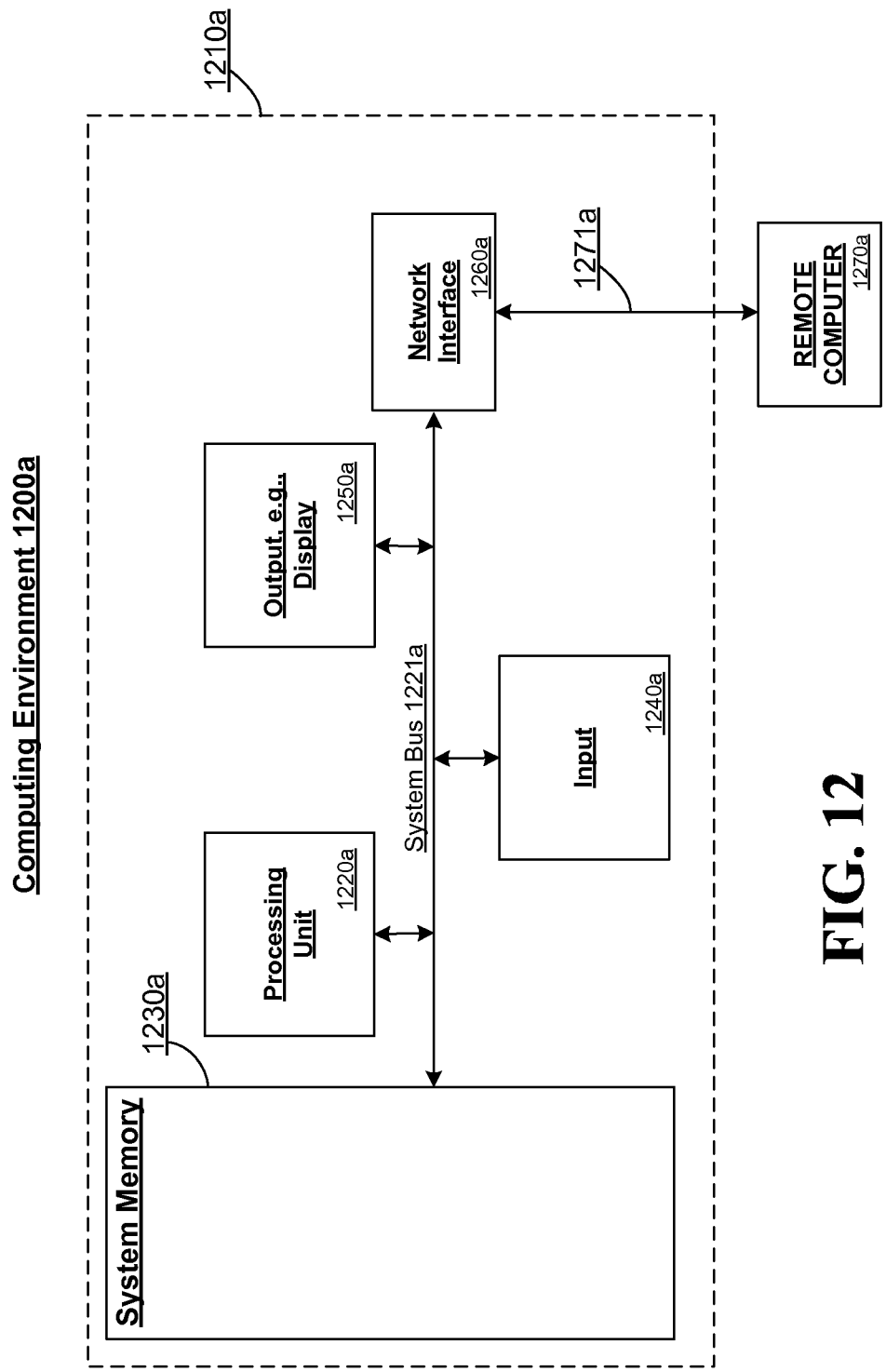
FIG. 12 is a block diagram representing an exemplary non-limiting computing system or operating environment in which the present invention may be implemented.

As mentioned, the invention applies to any device wherein it may be desirable to synchronize any kind of data across a set of devices. It should be understood, therefore, that handheld, portable and other computing devices and computing objects of all kinds are contemplated for use in connection with the present invention, i.e., anywhere that a device may benefit from sharing of data across devices or otherwise receive, process or store data. Accordingly, the below general purpose remote computer described below in FIG. 12 is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 12 thus illustrates an example of a suitable computing system environment 1200a in which the invention may be implemented, although as made clear above, the computing system environment 1200a is only one example of a suitable computing environment for a media device and is not intended to suggest any limitation as to the scope of use or functionality of the invention. Neither should the computing environment 1200a be interpreted as having any dependency or requirement relating to any one or combination of components illustrated in the exemplary operating environment 1200a.

With reference to FIG. 12, an exemplary remote device for implementing the invention includes a general purpose computing device in the form of a computer 1210a. Components of computer 1210a may include, but are not limited to, a processing unit 1220a, a system memory 1230a, and a system bus 1221a that couples various system components including the system memory to the processing unit 1220a. The system bus 1221a may be any of several types of bus structures including a memory bus or memory controller, a peripheral bus, and a local bus using any of a variety of bus architectures.

Computer 1210a typically includes a variety of computer readable media. Computer readable media can be any available media that can be accessed by computer 1210a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1210*a*. Communication media typically embodies computer readable instructions, data structures, program modules or other data in a modulated data signal such as a carrier wave or other transport mechanism and includes any information delivery media.

The system memory 1230*a* may include computer storage media in the form of volatile and/or nonvolatile memory such as read only memory (ROM) and/or random access memory (RAM). A basic input/output system (BIOS), containing the basic routines that help to transfer information between elements within computer 1210*a*, such as during start-up, may be stored in memory 1230*a*. Memory 1230*a* typically also contains data and/or program modules that are immediately accessible to and/or presently being operated on by processing unit 1220*a*. By way of example, and not limitation, memory 1230*a* may also include an operating system, application programs, other program modules, and program data.

The computer 1210*a* may also include other removable/non-removable, volatile/nonvolatile computer storage media. For example, computer 1210*a* could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1221*a* through a non-removable memory interface such as an interface, and a magnetic disk drive or optical disk drive is typically connected to the system bus 1221*a* by a removable memory interface, such as an interface.

A user may enter commands and information into the computer 1210*a* through input devices such as a keyboard and pointing device, commonly referred to as a mouse, trackball or touch pad. Other input devices may include a microphone, joystick, game pad, satellite dish, scanner, or the like. These and other input devices are often connected to the processing unit 1220*a* through user input 1240*a* and associated interface(s) that are coupled to the system bus 1221*a*, but may be connected by other interface and bus structures, such as a parallel port, game port or a universal serial bus (USB). A graphics subsystem may also be connected to the system bus 1221*a*. A monitor or other type of display device is also connected to the system bus 1221*a* via an interface, such as output interface 1250*a*, which may in turn communicate with video memory. In addition to a monitor, computers may also include other peripheral output devices such as speakers and a printer, which may be connected through output interface 1250*a*.

The computer 1210*a* may operate in a networked or distributed environment using logical connections to one or more other remote computers, such as remote computer 1270*a*, which may in turn have media capabilities different from device 1210*a*. The remote computer 1270*a* may be a personal computer, a server, a router, a network PC, a peer device or other common network node, or any other remote media consumption or transmission device, and may include any or all of the elements described above relative to the computer 1210*a*. The logical connections depicted in FIG. 12 include a network 1271*a*, such local area network (LAN) or a wide area network (WAN), but may also include other networks/buses. Such networking environments are commonplace in homes, offices, enterprise-wide computer networks, intranets and the Internet.

When used in a LAN networking environment, the computer 1210*a* is connected to the LAN 1271*a* through a network interface or adapter. When used in a WAN networking environment, the computer 1210*a* typically includes a communications component, such as a modem, or other means for establishing communications over the WAN, such as the Internet. A communications component, such as a modem, which may be internal or external, may be connected to the system bus 1221*a* via the user input interface of input 1240*a*, or other appropriate mechanism. In a networked environment, program modules depicted relative to the computer 1210*a*, or portions thereof, may be stored in a remote memory storage device. It will be appreciated that the network connections shown and described are exemplary and other means of establishing a communications link between the computers may be used.

There are multiple ways of implementing the present invention, e.g., an appropriate API, tool kit, driver code, operating system, control, standalone or downloadable software object, etc. which enables applications and services to use the systems and methods for representing and exchanging knowledge in accordance with the invention. The invention contemplates the use of the invention from the standpoint of an API (or other software object), as well as from a software or hardware object that performs the knowledge exchange in accordance with the invention. Thus, various implementations of the invention described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts may be applied to any computing device or system in which it is desirable to synchronize data with another computing device or system. For instance, the synchronization processes of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the synchronization services and/or processes of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any language to provide methods for representing and exchanging knowledge for a set of nodes in accordance with the invention. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for data synchronization between a plurality of nodes communicatively coupled via one or more networks, comprising:
transmitting a ping from an originating node to a different node independent from data to be synchronized;
subsequent to transmitting the ping and based on a determination obtained in response to the ping that one or more updates to knowledge maintained by the different node have occurred subsequent to a previous synchronization, transmitting knowledge to be synchronized from the originating node to the different node, the knowledge to be synchronized being transmitted subsequent to the ping and in a separate transmission from the ping, the knowledge including a label for each object in the knowledge to be synchronized and version information for each object in the knowledge to be synchronized;
receiving the knowledge maintained by the different node in response to the transmission of the knowledge from the originating node, the knowledge maintained by the different node including a label for each object in the knowledge maintained by the different node and version information for each object in the knowledge maintained by the different node, the knowledge maintained by the different node being received with one or more changes related to one or more objects in the knowledge maintained by the different node;
performing a comparison of a scope of the knowledge maintained by the originating node with a scope of the knowledge maintained by the different node; and
synchronizing the knowledge maintained by the originating node with the knowledge maintained by the different mode.

2. The method of claim 1, further comprising:
ascertaining that the scope of the knowledge maintained by the originating node has a same scope as the knowledge maintained by the different node; and
synchronizing the knowledge maintained by the originating node according to knowledge maintained by the originating node and knowledge maintained by the different node.

3. The method of claim 1, further comprising:
ascertaining that the scope of the knowledge maintained by the originating node has a different scope as the knowledge maintained by the different node; and
synchronizing the knowledge maintained by the originating node according to knowledge maintained by the originating node and knowledge maintained by the different node as projected onto an intersection of the knowledge maintained by the originating node and the filtered knowledge maintained by the different node.

4. The method of claim 1, further comprising propagating the knowledge maintained by the different node to a subsequent node via the originating node.

5. The method of claim 4, wherein the propagating is performed while the originating node is connected to the different node.

6. The method of claim 4, wherein the propagating is performed while the subsequent node is not connected to the different node.

7. The method of claim 4, wherein the propagating comprises defining messaging for knowledge-based transfers using extensible markup language (XML) Web services.

8. The method of claim 1, wherein the synchronizing is performed by at least comparing versioning of one or more objects identified in the received knowledge from the different node with versioning of the one or more objects that are also identified from the knowledge of the originating node, the synchronizing further including determining a conflict exists for the one or more objects when both the originating node and the different node made changes to a same version of the one or more objects and storing the knowledge from the different node and the originating node corresponding to the one or more objects which are associated with the determined conflict for a subsequent conflict resolution.

9. A system configured to synchronize data between a plurality of nodes communicatively coupled via one or more networks, comprising:
at least one processor;
a transmitting component configured to transmit a request associated with synchronizing filtered knowledge maintained by an originating node with filtered knowledge maintained by a different node, wherein the filtered knowledge maintained by the originating node corresponds to a subset of knowledge maintained by the originating node, and wherein the filtered knowledge maintained by the different node corresponds to a subset of knowledge maintained by the different node, the transmitting component also being configured to transmit a ping from the originating node to a different node independent from data to be synchronized;
a receiving component configured to receive the filtered knowledge maintained by the different node in response to the request;
a synchronization component configured to synchronize the knowledge maintained by the originating node with the knowledge maintained by the different mode based on a comparison of a scope of the filtered knowledge maintained by the originating node with a scope of the filtered knowledge maintained by the different node by at least comparing versioning of one or more objects identified in the received knowledge from the different node with versioning of the one or more objects that are also identified from the knowledge of the originating node; and
one or more storage media having stored computer-executable instructions which are executable by the at least one processor to implement a method that includes:
transmitting the ping;
subsequent to transmitting the ping and based on a determination obtained in response to the ping that one or more updates to the knowledge maintained by the different node have occurred subsequent to a previous synchronization, transmitting the knowledge to be synchronized from the originating node to the different node, the knowledge to be synchronized being transmitted subsequent to the ping and in a separate transmission from the ping;

receiving the filtered knowledge maintained by the different node in response to the transmission of the filtered knowledge from the originating node, the filtered knowledge maintained by the different node including a label for each object in the filtered knowledge maintained by the different node and version information for each object in the filtered knowledge maintained by the different node, the filtered knowledge maintained by the different node being received with one or more changes related to one or more objects in the filtered knowledge maintained by the different node;

performing the comparison of the scope of the filtered knowledge maintained by the originating node with the scope of the filtered knowledge maintained by the different node; and synchronizing the filtered knowledge maintained by the originating node with the filtered knowledge maintained by the different mode.

10. The system of claim 9, wherein the synchronization component is further configured to:

ascertain that the scope of the filtered knowledge maintained by the originating node has a same scope as the filtered knowledge maintained by the different node; and synchronize the knowledge maintained by the originating node according to knowledge maintained by the originating node and knowledge maintained by the different node.

11. The system of claim 9, wherein the synchronization component is further configured to:

ascertain that the scope of the filtered knowledge maintained by the originating node has a different scope as the filtered knowledge maintained by the different node; and synchronize the knowledge maintained by the originating node according to knowledge maintained by the originating node and knowledge maintained by the different node as projected onto an intersection of the filtered knowledge maintained by the originating node and the filtered knowledge maintained by the different node.

12. The system of claim 9, wherein the synchronization component is configured to propagate the filtered knowledge maintained by the different node to a subsequent node via the originating node.

13. The system of claim 9, wherein the synchronization component is configured to define messaging for knowledge-based transfers using extensible markup language (XML) Web services.

14. The system of claim 9, wherein the receiving component is configured to accrue collective knowledge, and wherein the collective knowledge is node-independent synchronization knowledge.

15. The system of claim 9, wherein at least one of the filtered knowledge maintained by the originating node or the filtered knowledge maintained by the different node includes a version representation of data.

16. The system of claim 9, wherein the synchronization component synchronizes the knowledge maintained by the originating node with the knowledge maintained by the different mode by at least comparing versioning of one or more objects identified in the received knowledge from the different node with versioning of the one or more objects that are also identified from the knowledge of the originating node, the synchronizing further including determining a conflict exists for the one or more objects when both the originating node and the different node made changes to a same version of the one or more objects and storing the knowledge from the different node and the originating node corresponding to the one or more objects which are associated with the determined conflict for a subsequent conflict resolution.

17. One or more hardware storage device storing computer-readable instructions which are executable by one or more processor of a computing system for causing the one or more processor to execute the following acts:

transmitting a ping from an originating node to a different node independent from data to be synchronized;

subsequent to transmitting the ping and based on a determination obtained in response to the ping that one or more updates to knowledge maintained by the different node have occurred subsequent to a previous synchronization, transmitting knowledge to be synchronized from the originating node to the different node, the knowledge to be synchronized being transmitted subsequent to the ping and in a separate transmission from the ping, the knowledge including a label for each object in the knowledge to be synchronized and version information for each object in the knowledge to be synchronized;

receiving the knowledge maintained by the different node in response to the transmission of the knowledge from the originating node, the knowledge maintained h the different node including a label for each object in the knowledge maintained by the different node and version information for each object in the knowledge maintained by the different node, the knowledge maintained by the different node being received with one or more changes related to one or more objects in the knowledge maintained by the different node;

performing a comparison of a scope of the knowledge maintained by the originating node with a scope of the knowledge maintained by the different node; and synchronizing the knowledge maintained by the originating node with the knowledge maintained by the different mode.

18. The one or more hardware storage device of claim 17, wherein the acts further comprise:

ascertaining that the scope of the filtered knowledge maintained by the originating node has a same scope as the filtered knowledge maintained by the different node; and synchronizing the knowledge maintained by the originating node according to knowledge maintained by the originating node and knowledge maintained by the different node.

19. The one or more hardware storage device of claim 17, wherein the acts further comprise:

ascertaining that the scope of the filtered knowledge maintained by the originating node has a different scope as the filtered knowledge maintained by the different node; and synchronizing the knowledge maintained by the originating node according to knowledge maintained by the originating node and knowledge maintained by the different node as projected onto an intersection of the filtered knowledge maintained by the originating node and the knowledge maintained by the different node.

20. The one or more hardware storage device of claim 17, wherein the acts further comprise propagating the filtered knowledge maintained by the different node to a subsequent node via the originating node.

21. The one or more hardware storage device of claim 20, wherein the acts further comprise comparing the filtered knowledge maintained by the different node with filtered knowledge maintained by the subsequent node to determine what changes to propagate to the subsequent node of which the subsequent node is unaware.

22. The one or more hardware storage device of claim 17, wherein at least one of the filtered knowledge maintained by the originating node or the filtered knowledge maintained by the different node includes a version representation of data.

23. The one or more hardware storage device of claim 17, wherein the synchronizing is performed by at least comparing versioning of one or more objects identified in the received knowledge from the different node with versioning of the one or more objects that are also identified from the knowledge of the originating node, the synchronizing further including determining a conflict exists for the one or more objects when both the originating node and the different node made changes to a same version of the one or more objects and storing the knowledge from the different node and the originating node corresponding to the one or more objects which are associated with the determined conflict for a subsequent conflict resolution.

\* \* \* \* \*